(12) United States Patent
Sheen et al.

(10) Patent No.: US 12,231,714 B2
(45) Date of Patent: *Feb. 18, 2025

(54) TECHNIQUES FOR CLOCK RATE SYNCHRONIZATION

(71) Applicant: Sonos, Inc., Santa Barbara, CA (US)

(72) Inventors: Timothy Sheen, Brighton, MA (US); Steven Bechardt, Santa Barbara, CA (US); Jeffrey Peters, Leominster, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,575

(22) Filed: Jul. 14, 2023

(65) Prior Publication Data

US 2024/0196040 A1    Jun. 13, 2024

Related U.S. Application Data

(63) Continuation of application No. 17/232,911, filed on Apr. 16, 2021, now Pat. No. 11,758,214.

(60) Provisional application No. 63/013,069, filed on Apr. 21, 2020.

(51) Int. Cl.
  *H04N 21/43* (2011.01)
  *H04N 21/233* (2011.01)
  *H04N 21/2387* (2011.01)
  *H04N 21/439* (2011.01)

(52) U.S. Cl.
  CPC ..... *H04N 21/4305* (2013.01); *H04N 21/2335* (2013.01); *H04N 21/2387* (2013.01); *H04N 21/4394* (2013.01)

(58) Field of Classification Search
  CPC ........... H04N 21/4305; H04N 21/2335; H04N 21/2387; H04N 21/4394; H04N 21/8106; H04N 7/52; G11B 20/10527; H04W 56/0015
  See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Vinncelas Louis
(74) *Attorney, Agent, or Firm* — Akerman LLP

(57) ABSTRACT

Disclosed herein are playback devices, groups of playback devices, and methods of operating playback devices and groupings thereof, wherein individual playback devices are configured to detect and correct clock rate drift by synchronizing a clock rate and perhaps clock time of a local clock to a remote time source.

20 Claims, 19 Drawing Sheets

(56) References Cited

U.S. PATENT DOCUMENTS

| | | | |
|---|---|---|---|
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,321,593 | B2 * | 11/2012 | Bushell ............ H04N 7/52 718/107 |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2013/0331970 | A1 | 12/2013 | Beckhardt et al. |
| 2016/0224314 | A1 * | 8/2016 | Vega-Zayas ....... H04N 21/8106 |
| 2017/0028605 | A1 | 2/2017 | Ravishankar et al. |
| 2017/0286051 | A1 * | 10/2017 | Mendes ............ H04N 21/8106 |
| 2018/0007647 | A1 * | 1/2018 | Bilstad ............. H04W 56/0015 |
| 2019/0073189 | A1 * | 3/2019 | Millington ....... G11B 20/10527 |

OTHER PUBLICATIONS

AudioTron Reference Manual, Version 3.0, May 2002, 70 pages.
Bluetooth. "Specification of the Bluetooth System: The ad hoc Scatternet for affordable and highly functional wireless connectivity," Core, Version 1.0 A, Jul. 26, 1999, 1068 pages.
AudioTron Setup Guide, Version 3.0, May 2002, 38 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance mailed on Apr. 17, 2023, issued in connection with U.S. Appl. No. 17/232,911, filed Apr. 16, 2021, 19 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

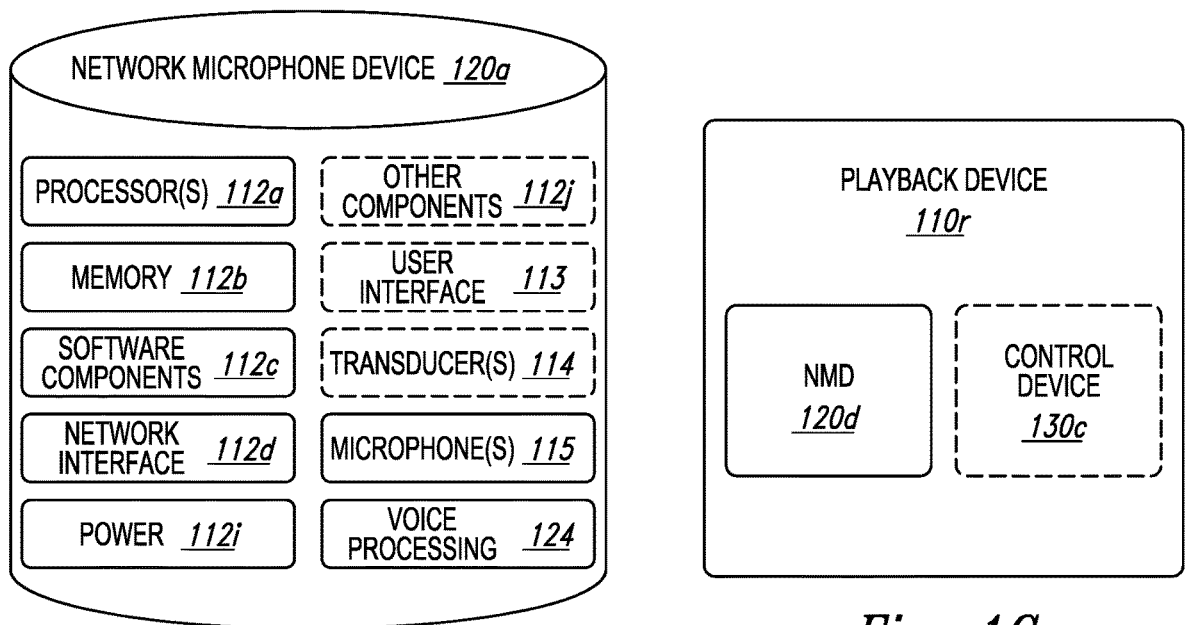
Fig. 1F
Fig. 1G
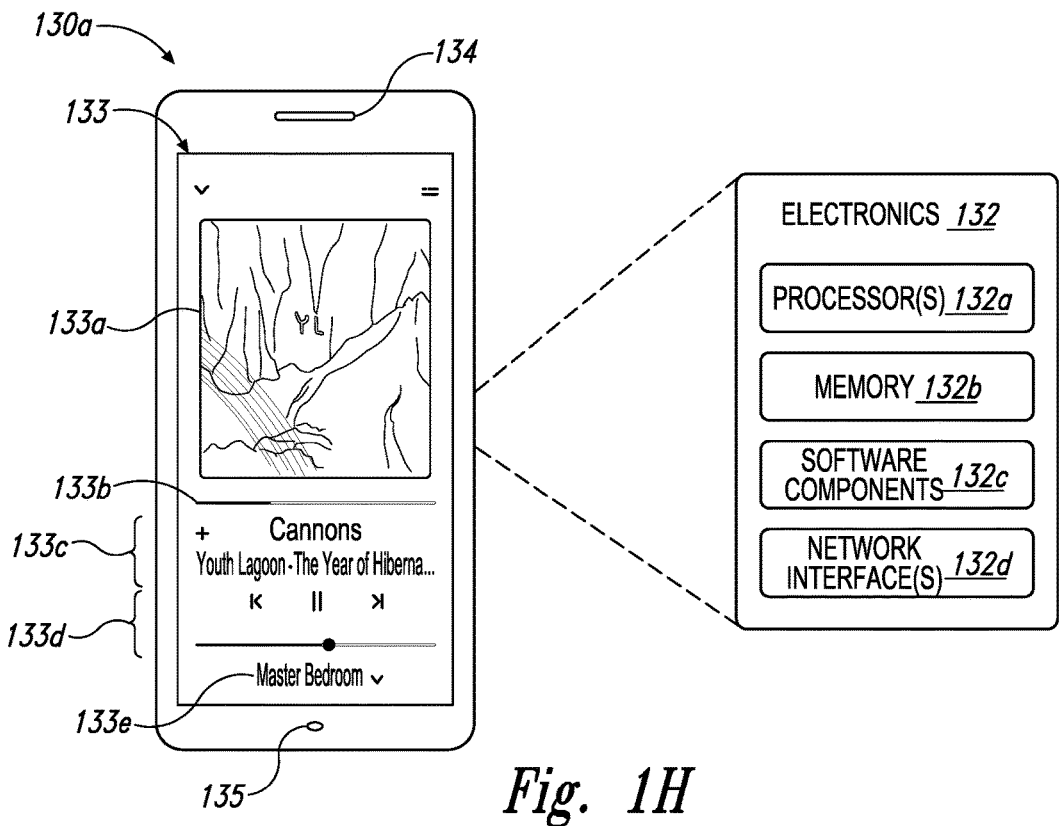
Fig. 1H

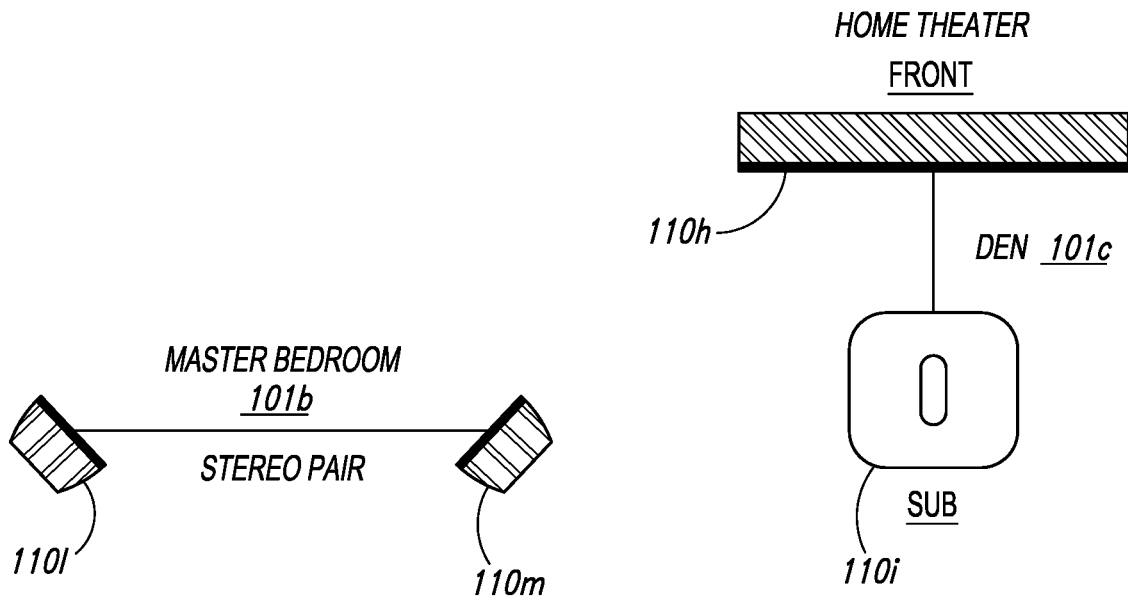
Fig. 1I
Fig. 1J
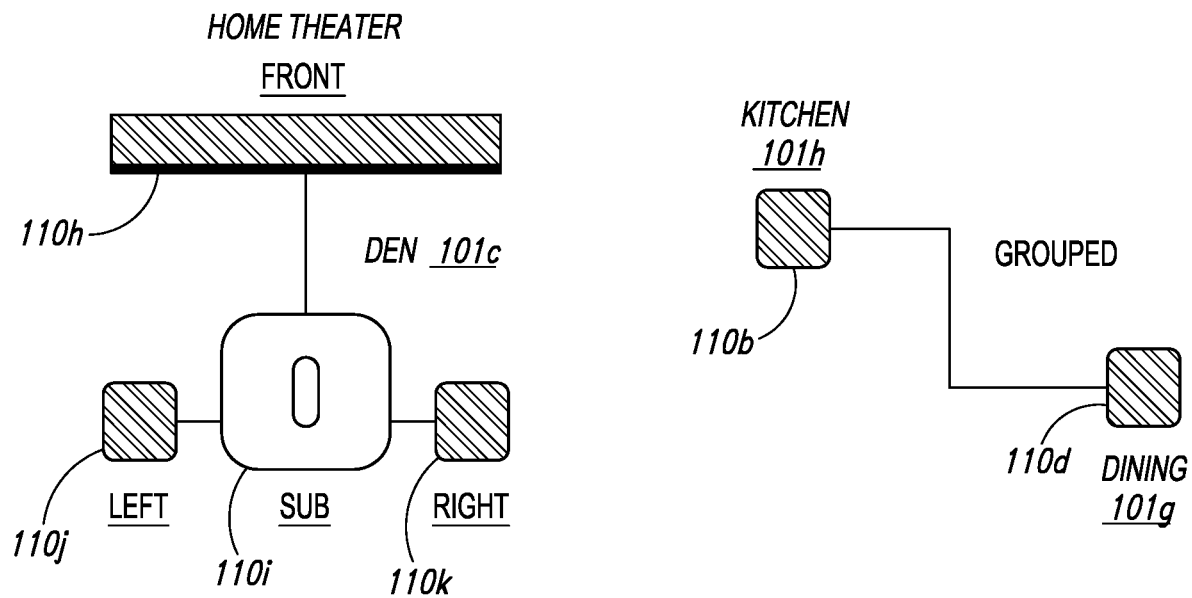
Fig. 1K
Fig. 1L

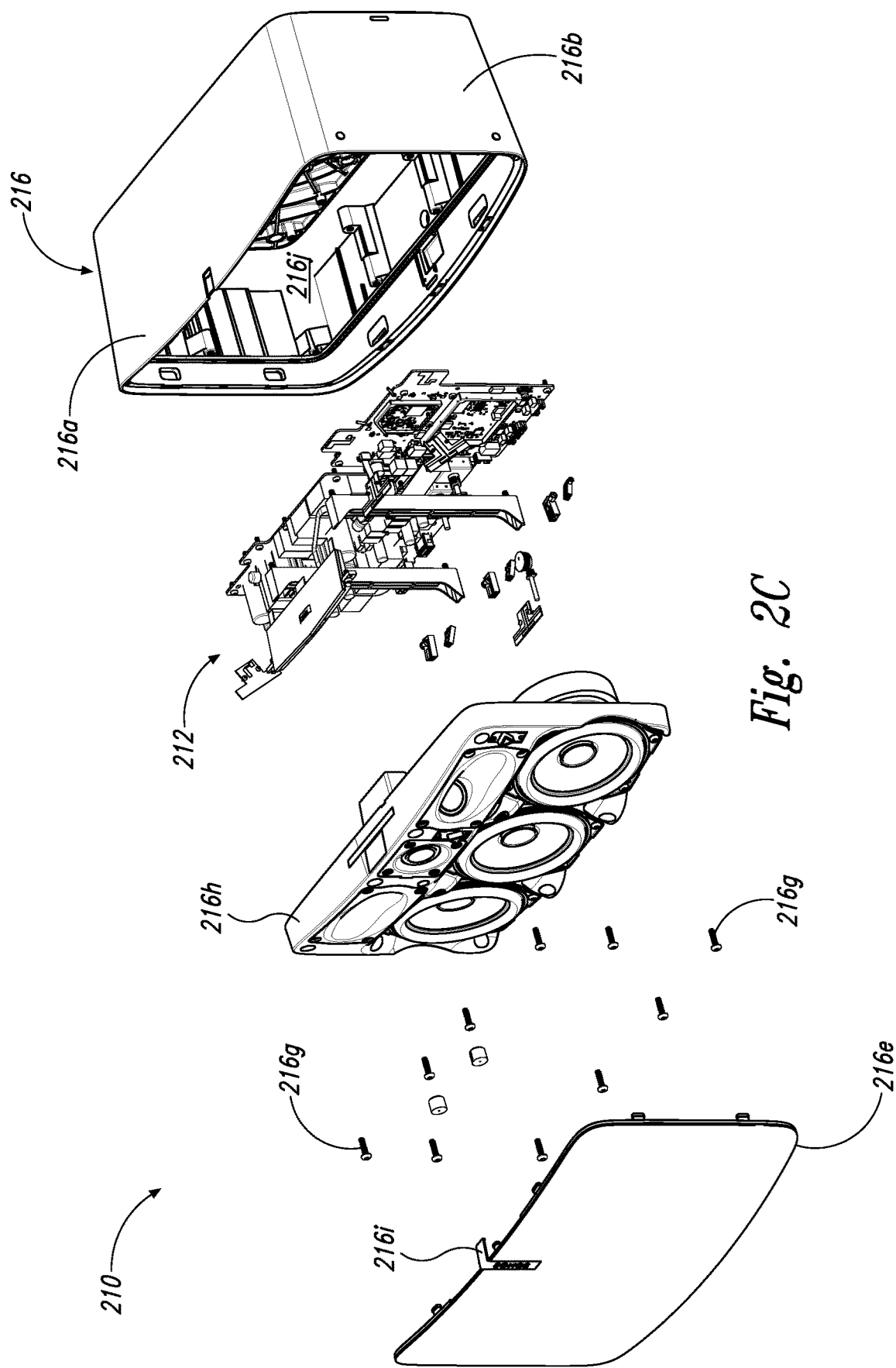

TECHNIQUES FOR CLOCK RATE SYNCHRONIZATION

CROSS-REFERENCE TO RELATED APPLICATIONS

The present application is a continuation of U.S. application Ser. No. 17/232,911, titled "Techniques for Clock Rate Synchronization," filed on Apr. 16, 2021, and currently pending; U.S. application Ser. No. 17/232,911 claims priority to U.S. Provisional App. 63/013,069, titled "Techniques for Clock Rate Synchronization," filed on Apr. 21, 2020 and now expired. The entire contents of the 17/232,911 and 63/013,069 applications are incorporated herein by reference.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F shows a block diagram of a network microphone device.

FIG. 1G shows a block diagram of a playback device.

FIG. 1H shows a partially schematic diagram of a control device.

FIGS. 1-I through 1L show schematic diagrams of corresponding media playback system zones.

FIG. 2C shows an exploded view of the playback device of FIG. 2A.

Figure 1A:
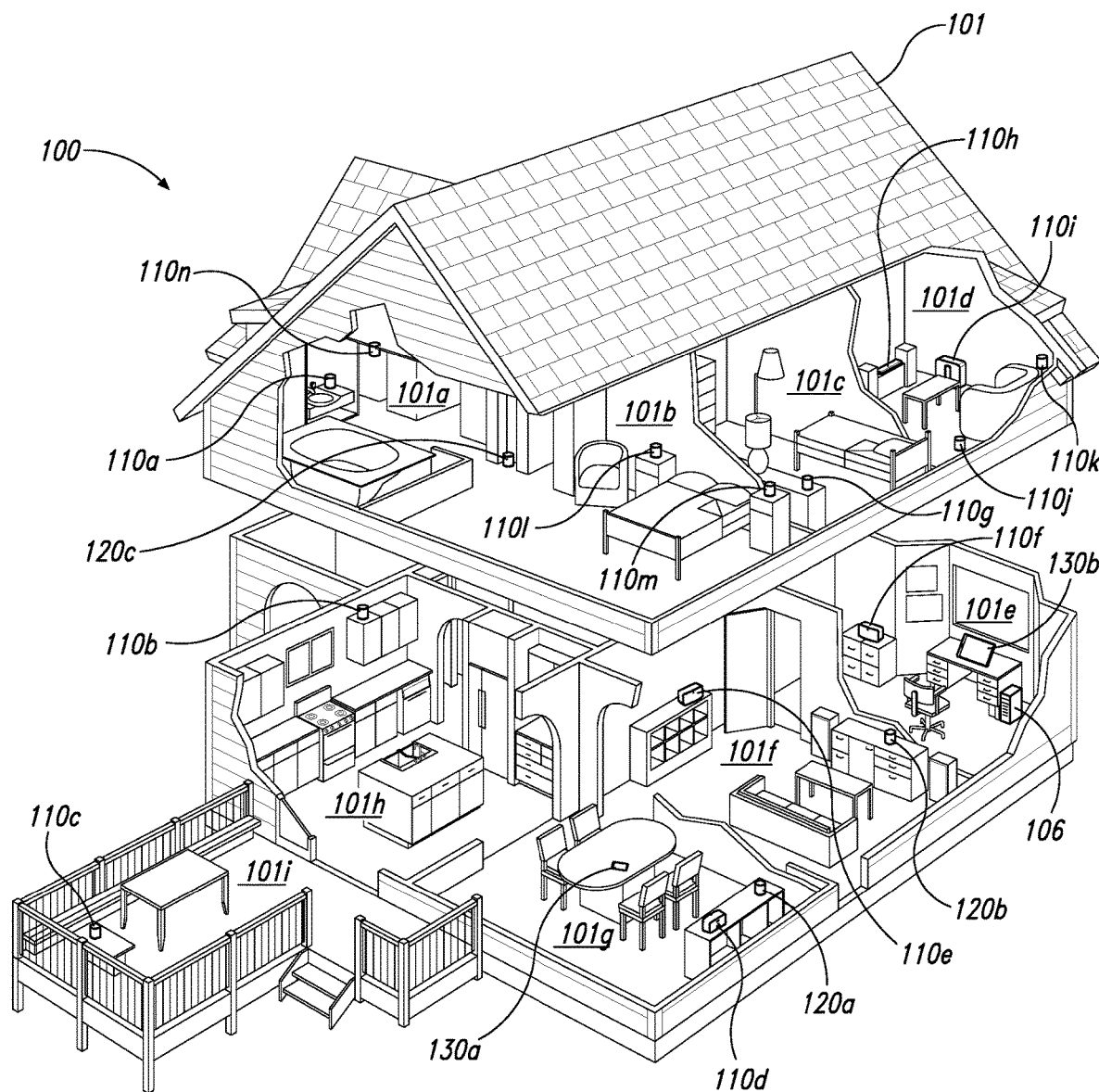
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

When multiple playback devices in a playback group play audio content together in a groupwise manner (e.g., in synchrony), it can be advantageous in some scenarios for the local clock at each playback device in the playback group to (i) have the same absolute time and/or (ii) operate at the same clock rate.

In operation, latency and jitter of data transmissions between a group coordinator and a group member are typically quite low because the group coordinator and group member are typically either on the same local area network (LAN) or have another type of high-quality short-range connection (e.g., Bluetooth or other wireless connection). As a result, an individual group member can generally obtain fairly accurate measurements of the difference (if any) in absolute time between itself and the group coordinator (or any other group member) using Simple Network Time Protocol (SNTP) or Network Time Protocol (NTP). Further, an individual group member can obtain these time difference measurements at a relatively high frequency (e.g., a few times a second, every second, or every few seconds) to identify and correct any clock drift at the group member before the group member's playback of audio content with the group coordinator (and perhaps other group members) becomes audibly out-of-sync with the group coordinator (and other group members, if applicable).

But in environments where a network connection between a timing source providing time information (e.g., the group coordinator or some other device providing a timing reference for the playback group) and an individual group member is of a lower quality (e.g., a scenario where the group coordinator or other timing reference is implemented by a cloud server), the accuracy of time difference measurements captured via SNTP or NTP varies based on the quality of the network connection. In operation, higher latency and/or jitter in the connection means less accurate measurements.

If an individual playback device is not able to obtain accurate time difference measurements, then the playback device may not be able to determine whether and the extent to which it may be experiencing clock rate drift relative to the time source (e.g., the group coordinator or other time source). And as a result, such a playback device may not be able to correct its clock drift before its playback of audio content with other playback devices in a playback group (e.g., the group coordinator and perhaps other group members) becomes audibly out-of-sync with the group coordinator and/or other group members.

Some embodiments disclosed herein overcome or at least ameliorate the above-described problems that can arise from playback device clock rate drift via devices configured to detect and correct clock rate drift, systems of devices that operate in concert to detect and correct clock rate drift, methods of detecting and correcting clock rate drift, and tangible, non-transitory computer-readable media with instructions that, when executed, detect and correct clock rate drift.

In some embodiments, individual playback devices (e.g., in a media playback system) lock onto a clock rate of a time source (e.g., regardless of whether the playback device is playing audio content) such that the clock rate of any two arbitrary playback devices (e.g., in a playback group and/or in the media playback system) is identical or at least very close to the same clock rate. When all the playback devices in the playback group are locked onto the clock rate of a common time source, the group of playback devices is better able to play audio content together in synchrony as long as they all have sufficiently close playback start times. Additionally, playback devices can tolerate larger differences in starting playback times if the clock rates of the playback devices are identical or at least very close to the same clock rate.

In some embodiments, the individual playback devices may perform operations to lock onto a clock rate of the time source regardless of whether the playback device is playing back audio content (e.g., while the player is otherwise sitting idle and/or while the player is performing operations other than playing music such as performing setup operations or forwarding networking traffic). By having the individual playback devices perform operations to lock onto the clock rate regardless of whether the playback device is playing back audio, the playback device can advantageously employ timing measurements obtained over a longer period of time in locking onto the clock rate (e.g., hours, days, weeks, etc.). By employing timing measurements obtained over a longer period of time, the playback device may advantageously employ timing measurements over a lower quality (e.g., timing measurements that would typically be unsuitable for use in tightly synchronizing clock rates). For example, as discussed in more detail below, the playback device may be able to employ time difference measurements captured via SNTP or NTP over a low-quality connection (e.g., a connection from the playback device over the Internet to a cloud server) to lock onto a clock rate.

Some embodiments include a first playback device that is configurable to operate in a group coordinator mode and/or a group member mode, including switching between operating in the group coordinator mode and/or group member mode.

While operating in the group coordinator mode, the first playback device is configured to perform functions comprising: (i) receiving first clock timing information via a first plurality of clock timing messages from a first time source at a first message receipt rate, (ii) controlling a clock rate of a clock at the first playback device based on the first clock timing information, (iii) receiving audio content from an audio source, (iv) using the clock at the first playback device to generate playback timing information for the audio content, (v) transmitting portions of the audio content and playback timing for the portions of the audio content to at least a second playback device, (vi) generating and transmitting second clock timing information via a second plurality of clock timing messages to at least the second playback device at a second message transmission rate, wherein the second message transmission rate is greater than the first message receipt rate, and wherein the second clock timing information comprises clock time information of the clock at the first playback device, and (vii) playing back the audio content in synchrony with at least the second playback device.

And while operating in the group member mode, the first playback device is configured to perform functions comprising (i) receiving first clock timing information via a first plurality of clock timing messages from a first time source at a first message receipt rate, (ii) estimating, using the first clock timing information, a clock rate error between a clock rate of the first time source and the clock rate of a clock in the first playback device, (iii) receiving audio content and playback timing for the audio content from the second playback device, (iv) receiving second clock timing information via a second plurality of clock timing messages from a second time source at a second message receipt rate, wherein the second message receipt rate is greater than the first message receipt rate, and (v) playing the audio content in synchrony with at least the second playback device based on the estimated clock rate error, the second clock timing information, and the playback timing for the audio content.

It should be appreciated that having the playback devices lock onto the clock rate of a common time source provides a wide range of additional benefits relative to conventional designs. For example, whenever a synchrony group is formed using conventional synchronization techniques, the group members have clock rates that are initially out-of-sync with the clock rate of the group coordinator. As a result, the group members need to synchronize their clock rates to the clock rate of the group coordinator when the new group is formed, which may take up to a few minutes (e.g., even in ideal network conditions). Given that users typically immediately play music after forming a new group, there may be initial differences in the playback rate of players within the newly formed group as the group members synchronize their clock rate to the clock rate of the group coordinator. In contrast, a design in accordance with the techniques described herein has the playback devices lock into the clock rate of a common time source. Accordingly, groups may be formed or modified arbitrarily without negative repercussions (e.g., different playback rates while the group members synchronize to the clock rate of the group coordinator).

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip hop music being played back by playback device 110*c* on the patio 101*i*. In some aspects, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
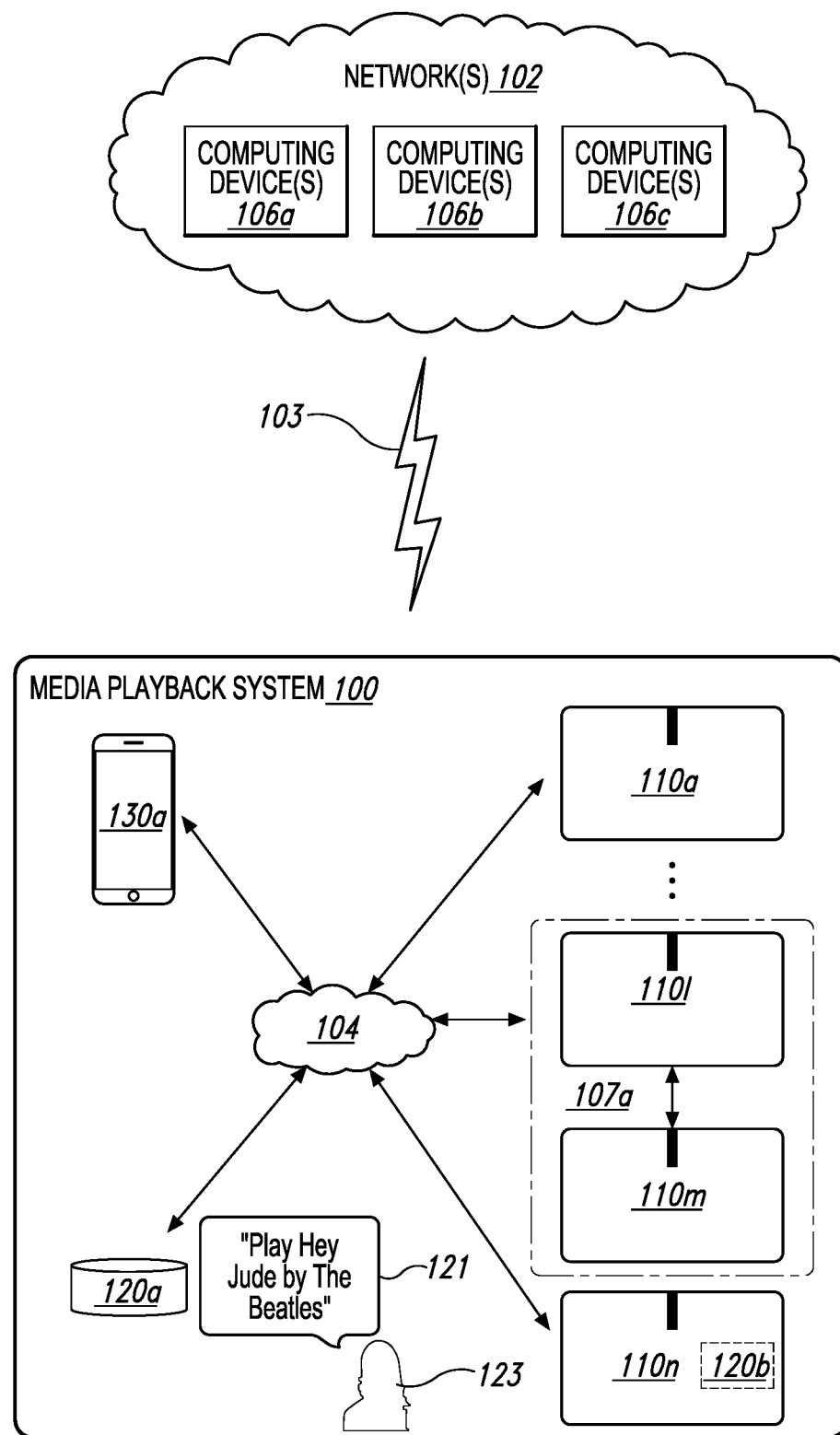
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN) (e.g., the Internet), one or more local area networks (LAN) (e.g., one or more WIFI networks), one or more personal area networks (PAN) (e.g., one or more BLUETOOTH networks, Z-WAVE networks, wireless Universal Serial Bus (USB) networks, ZIGBEE networks, and/or IRDA networks), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct or indirect connections, PANs, LANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through 1M.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
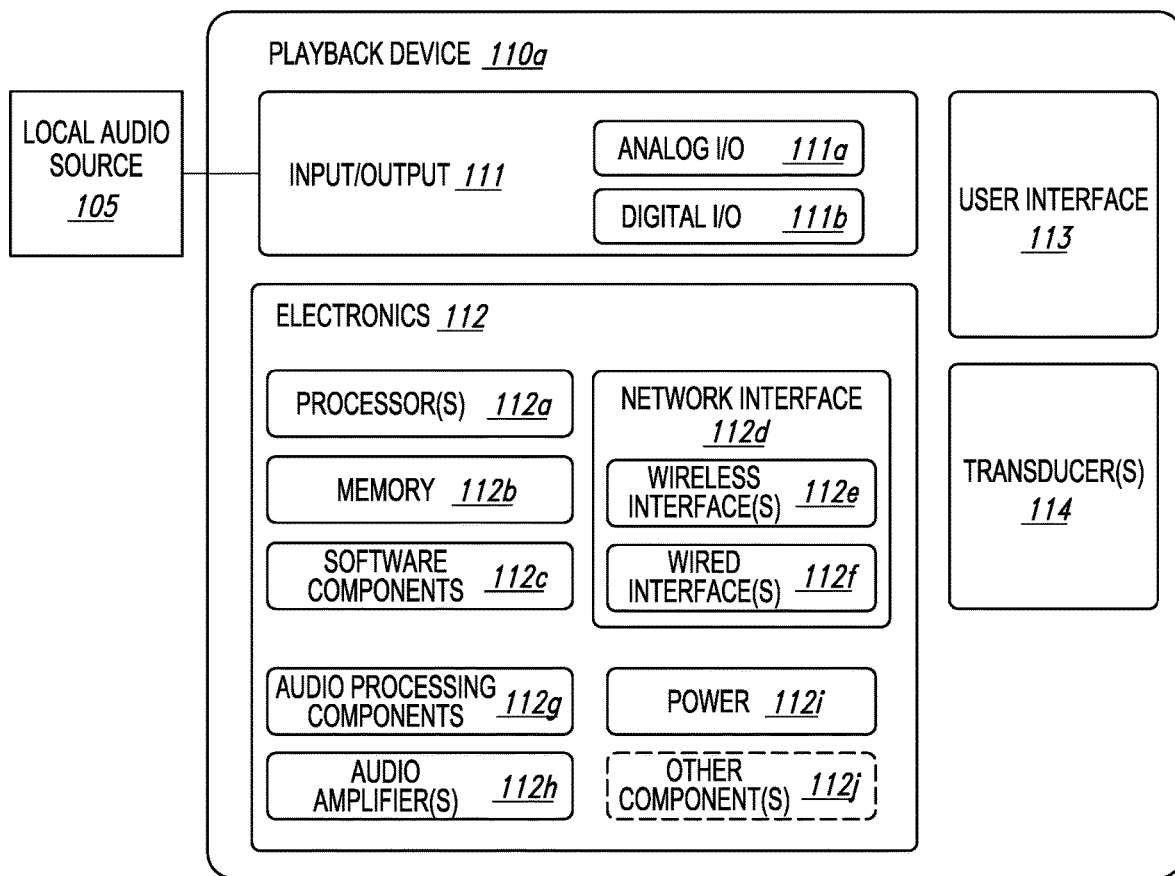
FIG. 1C shows a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B), amplify the received audio, and output the amplified audio for playback via one or more of the transducers 114. In some embodiments, the playback device 110*a* optionally includes one or more microphones 115 (e.g., a single microphone, a plurality of microphones, a microphone array) (hereinafter referred to as "the microphones 115"). In certain embodiments, for example, the playback device 110*a* having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some embodiments, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio information from an audio source (e.g., one or more of the computing devices 106a-c (FIG. 1B)), and/or another one of the playback devices 110. In some embodiments, the operations further include causing the playback device 110a to send audio information to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). The headphone may comprise a headband coupled to one or more earcups. For example, a first earcup may be coupled to a first end of the headband and a second earcup may be coupled to a second end of the headband that is opposite the first end. Each of the one or more earcups may house any portion of the electronic components in the playback device, such as one or more transducers. Further, the one or more earcups may include a user interface for controlling operation of the headphone such as for controlling audio playback, volume level, and other functions. The user interface may include any of a variety of control elements such as buttons, knobs, dials, touch-sensitive surfaces, and/or touchscreens. An ear cushion may be coupled each of the one or more earcups. The ear cushions may provide a soft barrier between the head of a user and the one or more earcups to improve user comfort and/or provide acoustic isolation from the ambient (e.g., provide passive noise reduction (PNR)). Additionally (or alternatively), the headphone may employ active noise reduction (ANR) techniques to further reduce the user's perception of outside noise during playback.

Figure 1D:
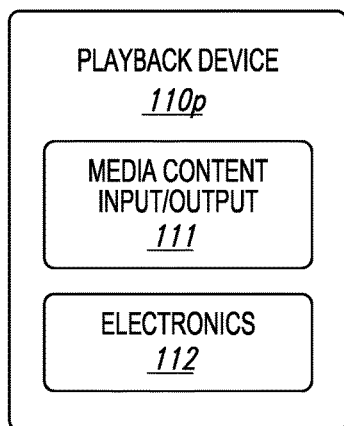
FIG. 1D shows a block diagram of a playback device.

In some embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
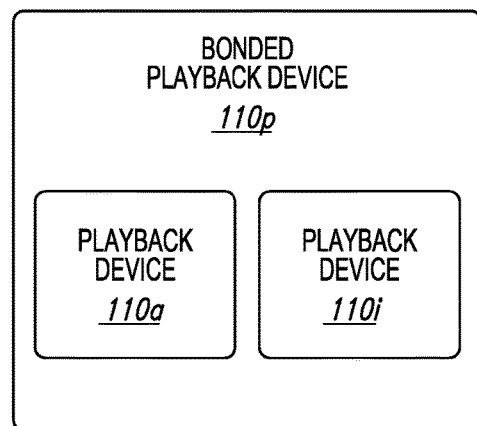
FIG. 1E shows a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120a (FIGS. 1A and 1). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1i). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1i). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130*a* is configured to operate as a playback device and an NMD. In other embodiments, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

FIGS. 1-I through 1M show example configurations of playback devices in zones and zone groups. Referring first to FIG. 1M, in one example, a single playback device may belong to a zone. For example, the playback device 110*g* in the second bedroom 101*c* (FIG. 1A) may belong to Zone C. In some implementations described below, multiple playback devices may be "bonded" to form a "bonded pair" which together form a single zone. For example, the playback device 110*l* (e.g., a left playback device) can be bonded to the playback device 110*l* (e.g., a left playback device) to form Zone A. Bonded playback devices may have different playback responsibilities (e.g., channel responsibilities). In another implementation described below, multiple playback devices may be merged to form a single zone. For example, the playback device 110*h* (e.g., a front playback device) may be merged with the playback device 110*i* (e.g., a subwoofer), and the playback devices 110*j* and 110*k* (e.g., left and right surround speakers, respectively) to form a single Zone D. In another example, the playback devices 110*g* and 110*h* can be merged to form a merged group or a zone group 108*b*. The merged playback devices 110*g* and 110*h* may not be specifically assigned different playback responsibilities. That is, the merged playback devices 110*h* and 110*i* may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110*l* and 110*m* may be bonded so as to produce or enhance a stereo effect of audio content. In this example, the playback device 110*l* may be configured to play a left channel audio component, while the playback device 110*k* may be configured to play a right channel audio component. In some implementations, such stereo bonding may be referred to as "pairing."

Figure 1M:
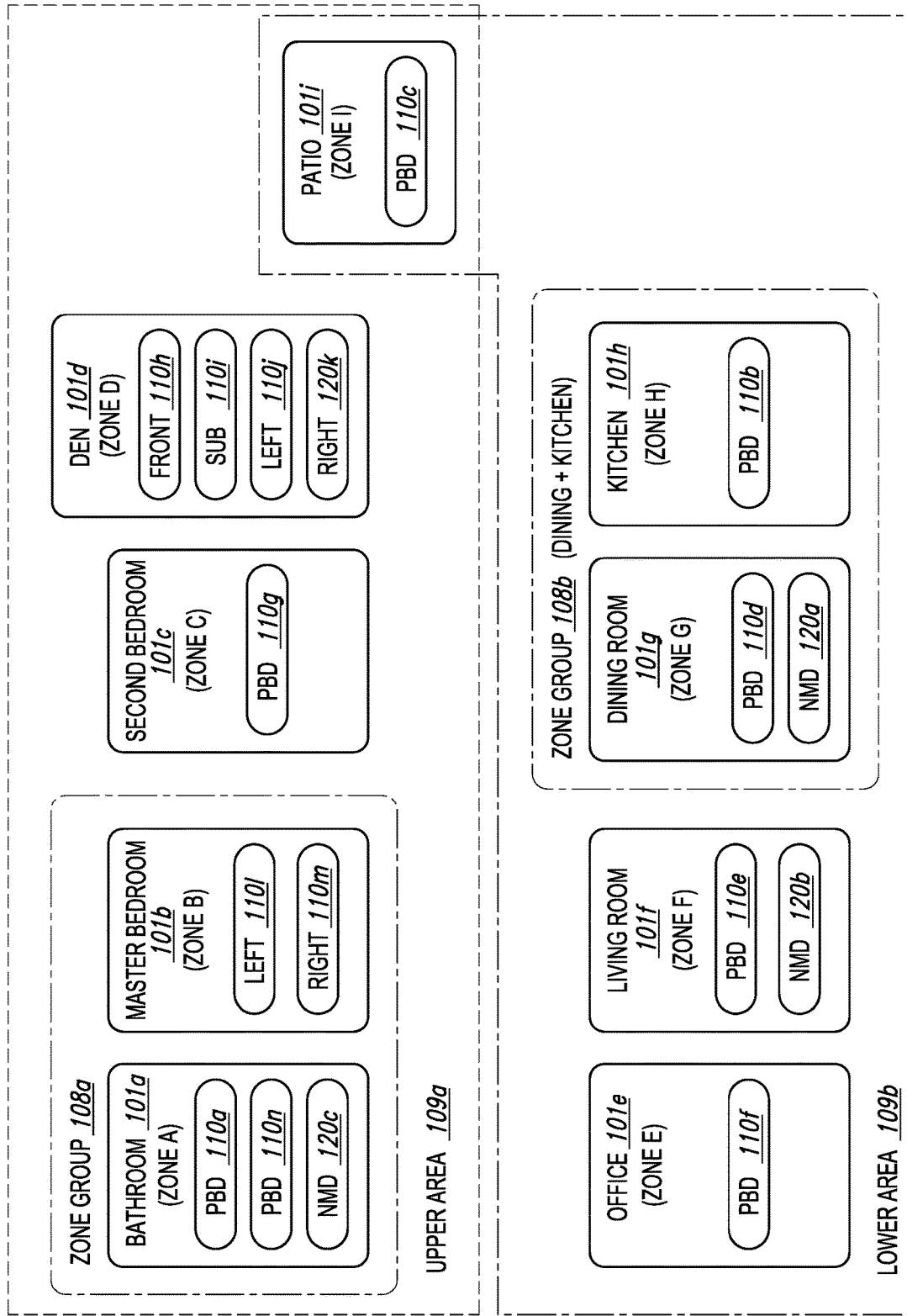
FIG. 1M shows a schematic diagram of media playback system areas.

Additionally, bonded playback devices may have additional and/or different respective speaker drivers. As shown in FIG. 1J, the playback device 110*h* named Front may be bonded with the playback device 110*i* named SUB. The Front device 110*h* can be configured to render a range of mid to high frequencies and the SUB device 110*i* can be configured render low frequencies. When unbonded, however, the Front device 110*h* can be configured render a full range of frequencies. As another example, FIG. 1K shows the Front and SUB devices 110*h* and 110*i* further bonded with Left and Right playback devices 110*j* and 110*k*, respectively. In some implementations, the Right and Left devices 110*j* and 102*k* can be configured to form surround or "satellite" channels of a home theater system. The bonded playback devices 110*h*, 110*i*, 110*j*, and 110*k* may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110*a* and 110*n* the master bathroom have the single UI entity of Zone A. In one embodiment, the playback devices 110*a* and 110*n* may each output the full range of audio content each respective playback devices 110*a* and 110*n* are capable of, in synchrony.

In some embodiments, an NMD is bonded or merged with another device so as to form a zone. For example, the NMD 120*b* may be bonded with the playback device 110*e*, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108*a* that includes the two zones. Similarly, Zone G may be grouped with Zone H to form the zone group 108*b*. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234, 395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108*b* can have be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
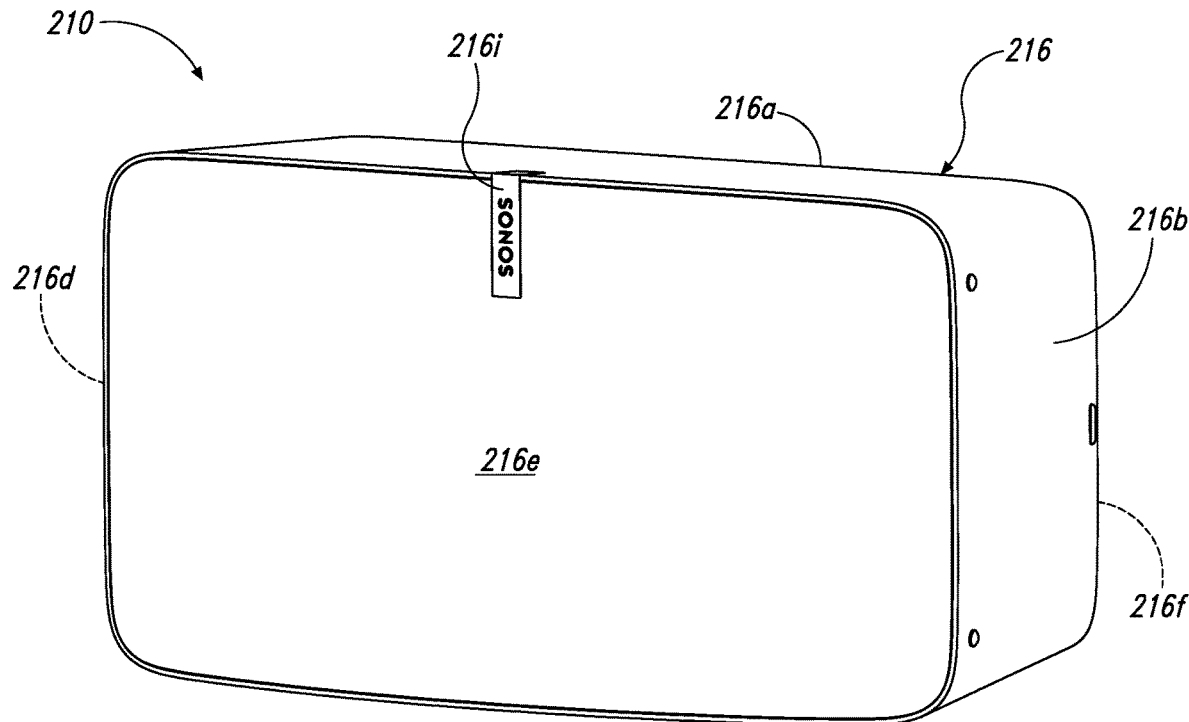
FIG. 2A shows a front isometric view of a playback device configured in accordance with aspects of the disclosed technology.
Figure 2B:
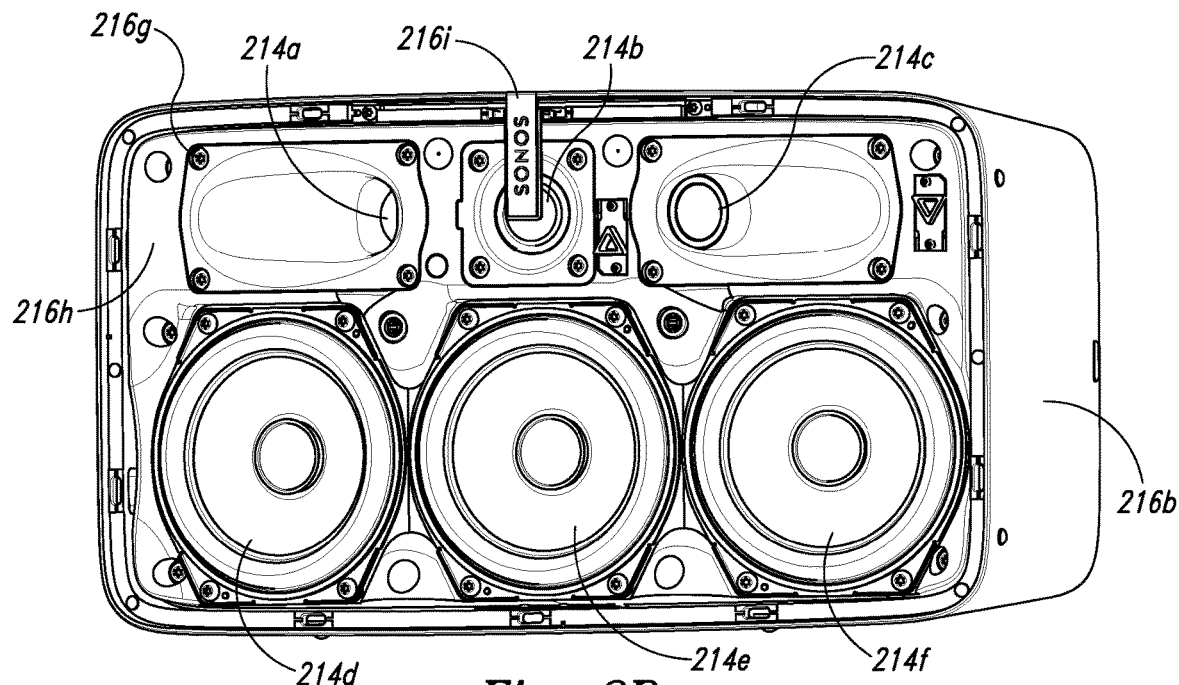
FIG. 2B shows a front isometric view of the playback device of FIG. 3A without a grille.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
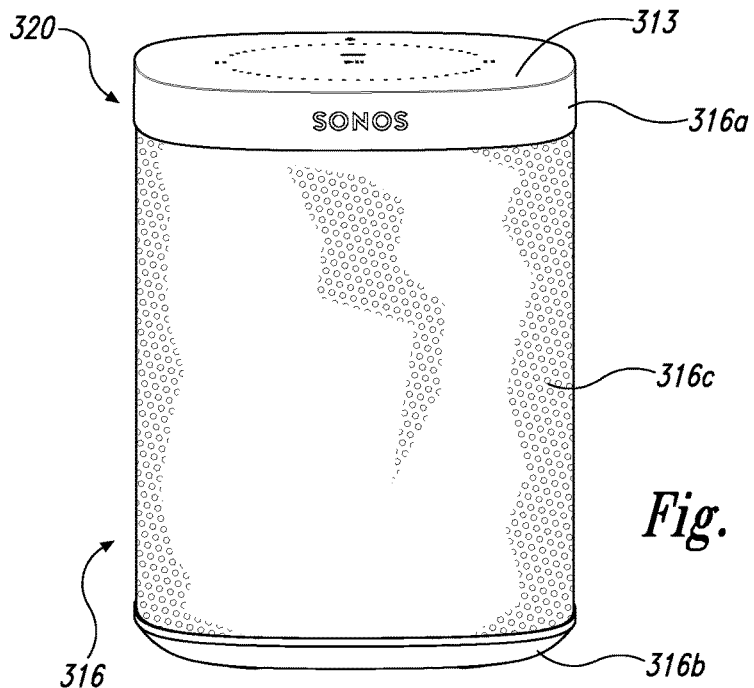
FIG. 3A shows a front view of a network microphone device configured in accordance with aspects of the disclosed technology.
Figure 3B:
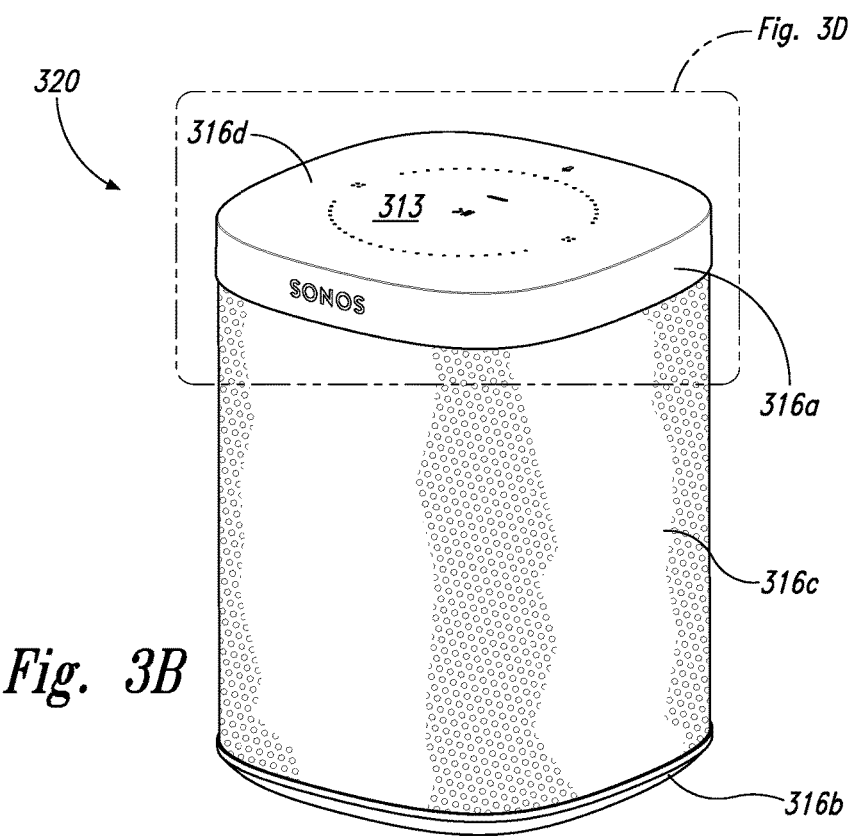
FIG. 3B shows a side isometric view of the network microphone device of FIG. 3A.
Figure 3C:
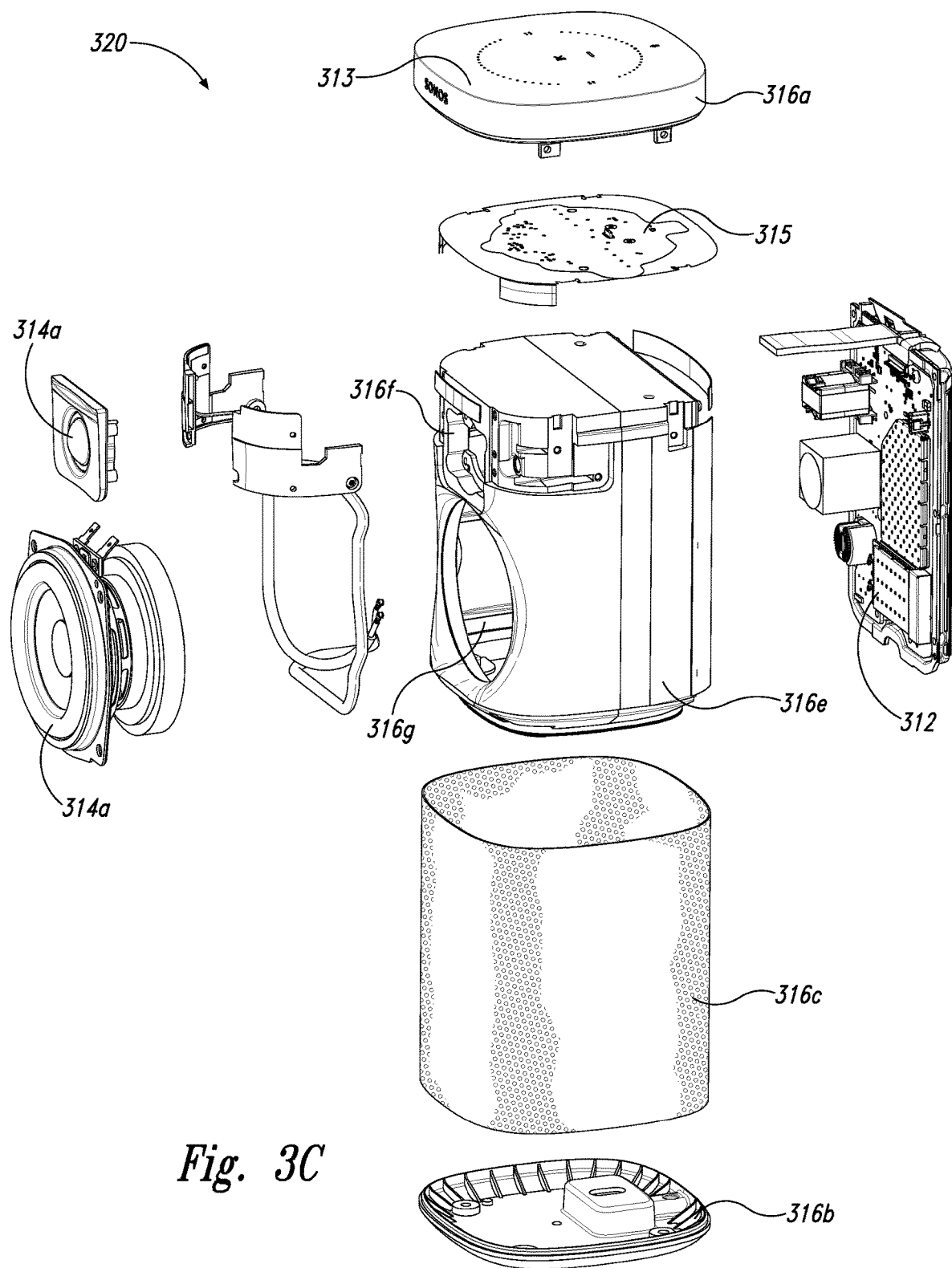
FIG. 3C shows an exploded view of the network microphone device of FIGS. 3A and 3B.
Figure 3D:
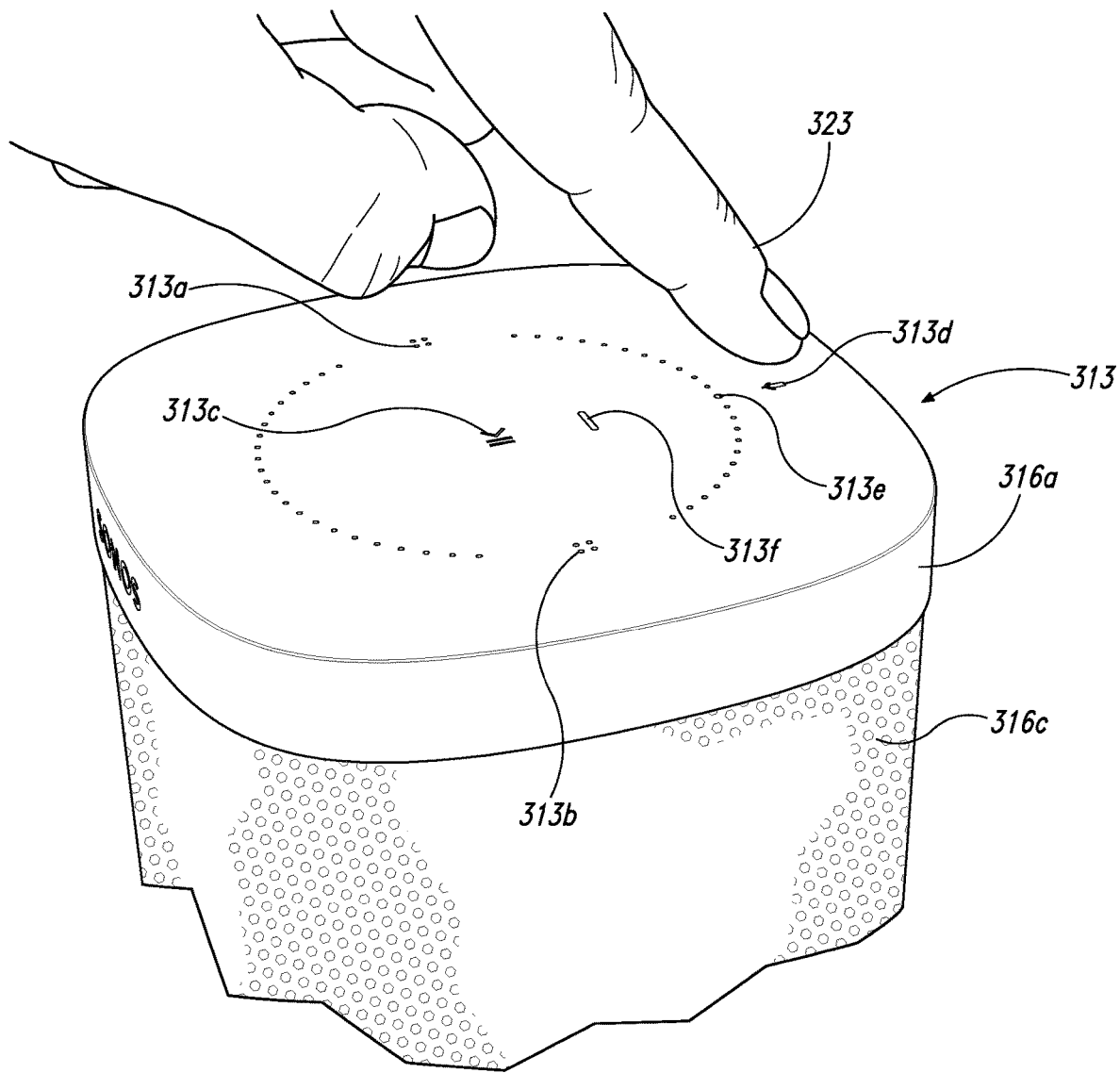
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
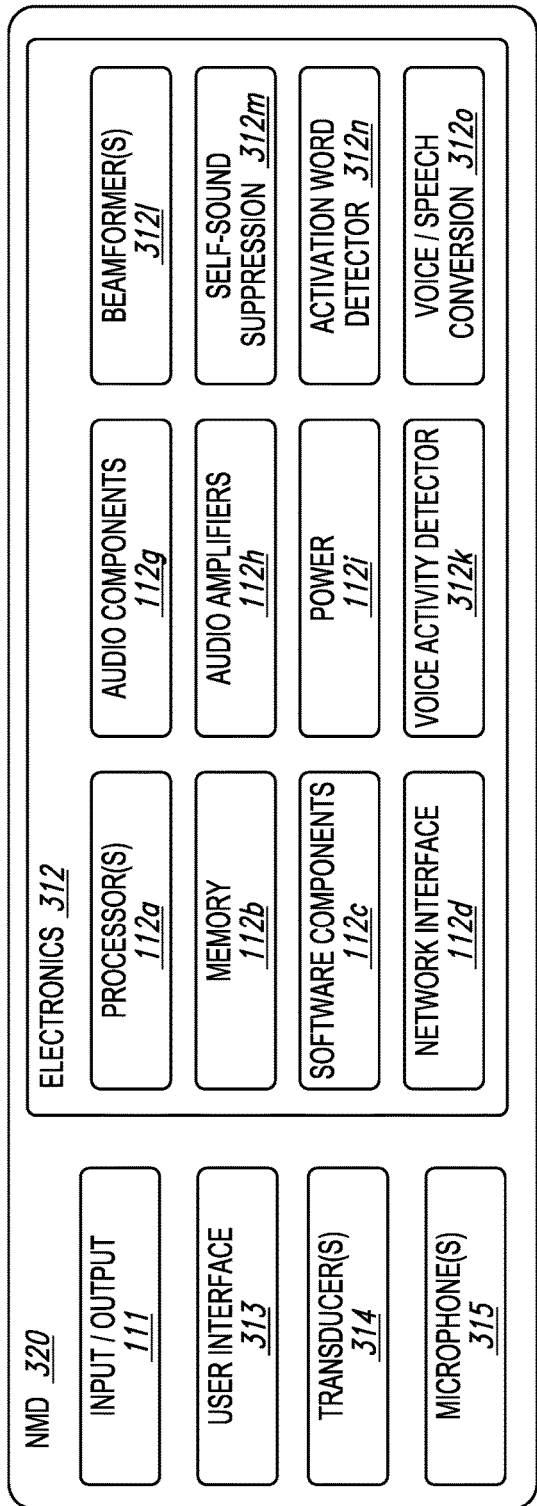
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require less computationally intensive algorithms than traditional voice activity services, which typically sample from a broad base of users and diverse requests that are not targeted to media playback systems.

Figure 3F:
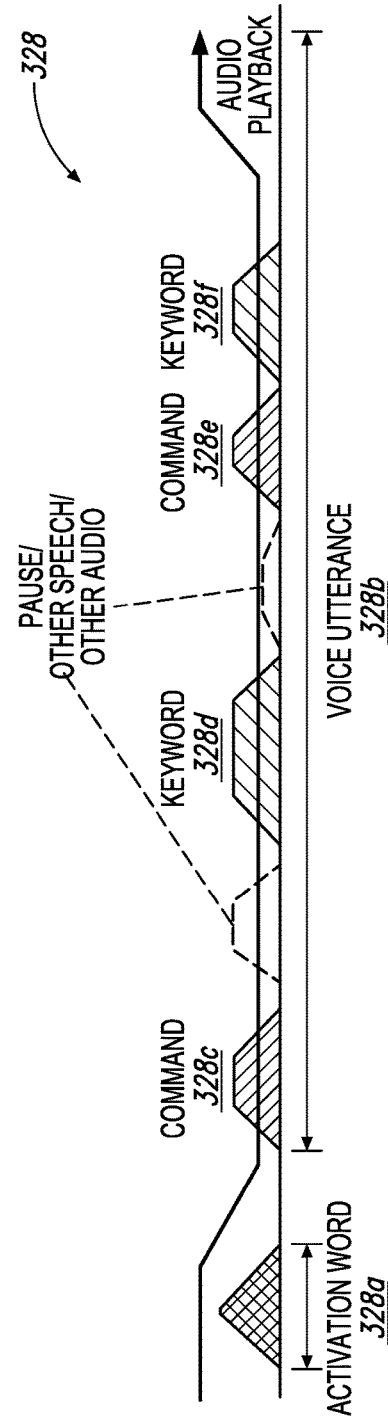
FIG. 3F shows a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NIB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
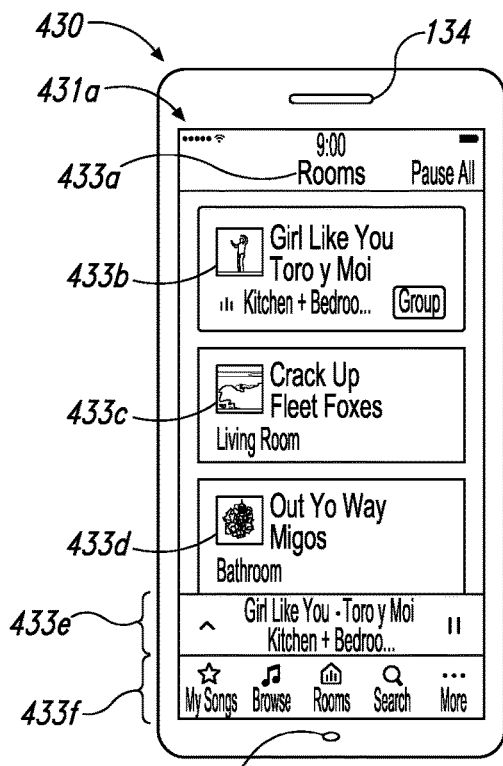
FIGS. 4A-4D show schematic diagrams of a control device in various stages of operation in accordance with aspects of the disclosed technology.
Figure 4B:
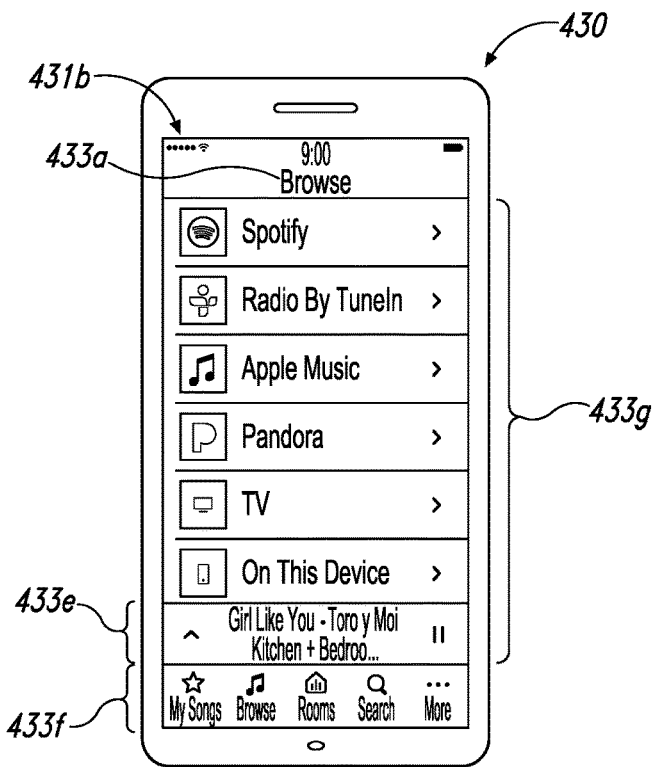
Figure 4C:
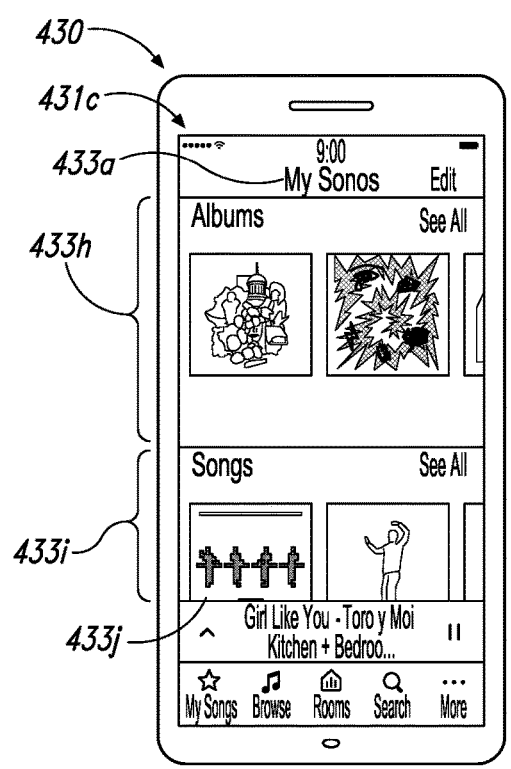
Figure 4D:
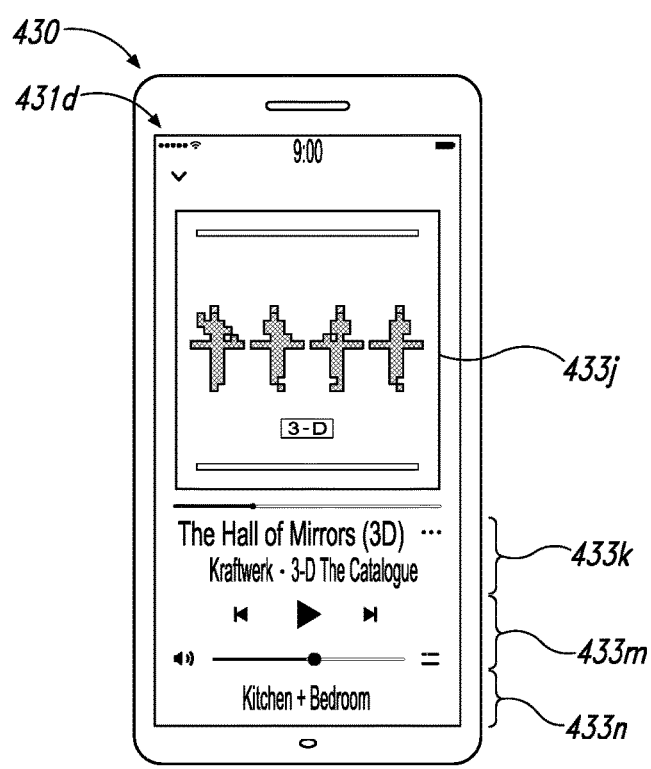

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
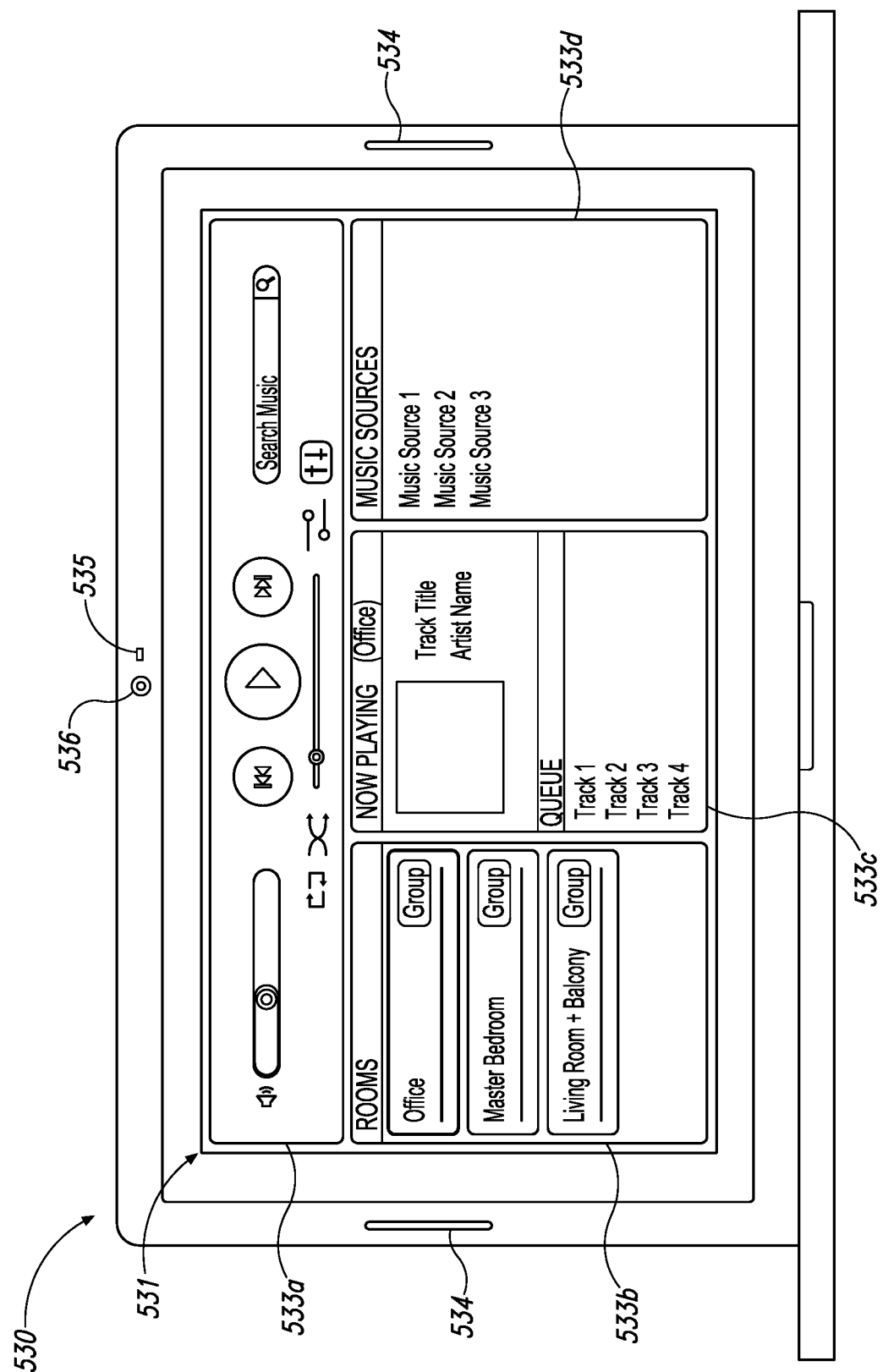
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as a playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
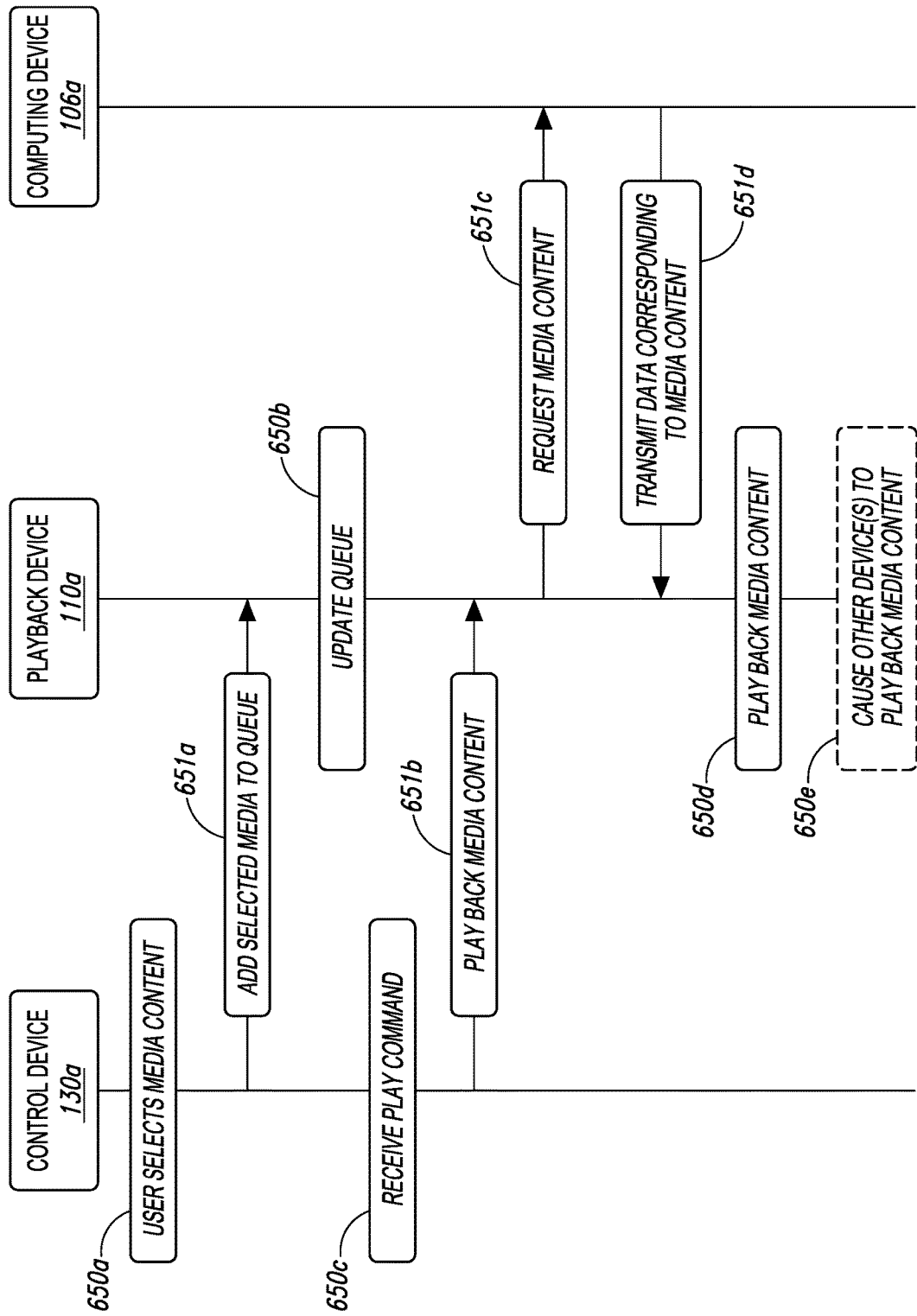
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Overview of Example Embodiments

As mentioned earlier, when multiple playback devices in a playback group play audio content together in a groupwise manner (e.g., in synchrony), it can be advantageous in some scenarios for the local clock at each playback device in the playback group to (i) have the same absolute time and/or (ii) operate at the same clock rate. In some embodiments, a playback group includes a group coordinator and one or more group members, where the group coordinator and the group members are playback devices. In some embodiments, the group coordinator is or comprises a laptop computer, tablet computer, smartphone or other computing device or computing system, and the group members are playback devices.

Playback devices in some embodiments include an oscillator (e.g., an on-chip oscillator integrated into the audio codec chip) configured to keep track of time within the playback device and in some instances, to synchronize with one or more other playback devices (or other computing devices) via a network time protocol (e.g., Simple Network Time Protocol (SNTP) or Network Time Protocol (NTP)) that identifies differences in absolute time. An individual playback device in some embodiments uses determined differences in absolute time to calculate both (i) the absolute time and (ii) whether the playback device's local clock rate is too fast or too slow compared to a time source. In some embodiments, a playback device uses identified differences in time to slowly modify: (1) the clock rate of the oscillator (e.g., changing a voltage applied to a voltage-controlled oscillator) and/or (2) the sample rate (e.g., speed up or slow down) the audio content being played back such that the audio content is played back in synchrony with the other playback devices in the playback group.

In operation, latency and jitter of data transmissions between a group coordinator and a group member are typically quite low because the group coordinator and group member are typically either on the same local area network (LAN) or have another type of high-quality short-range connection (e.g., Bluetooth or other wireless connection). As a result, an individual group member can generally obtain fairly accurate measurements of the difference (if any) in absolute time between itself and the group coordinator (or any other group member) using SNTP or NTP. Further, an individual group member can obtain these time difference measurements at a relatively high frequency (e.g., a few times a second, every second, or every few seconds) to identify and correct any clock drift at the group member before the group member's playback of audio content with the group coordinator (and perhaps other group members) becomes audibly out-of-sync with the group coordinator (and other group members, if applicable).

But in environments where the network connection between a timing source providing time information (e.g., the group coordinator or some other device providing a timing reference for the playback group) and an individual group member is of a lower quality (e.g., a scenario where the group coordinator or other timing reference is implemented by a cloud server), the accuracy of time difference measurements captured via SNTP or NTP varies based on the quality of the network connection. In operation, higher latency and/or jitter in the connection means less accurate measurements. For example, the accuracy of time difference measurements captured via SNTP or NTP between two devices communicating over the public Internet could be +/− hundreds of milliseconds instead of +/− a few milliseconds when the devices are on the same LAN or perhaps connected via Bluetooth or some other short-range wireless link.

If an individual playback device is not able to obtain accurate time difference measurements, then the playback device may not be able to determine whether and the extent to which it may be experiencing clock rate drift relative to the time source (e.g., the group coordinator or other time source). And as a result, such a playback device may not be able to correct its clock drift before its playback of audio content with other playback devices in a playback group (e.g., the group coordinator and perhaps other group members) becomes audibly out-of-sync with the group coordinator and/or other group members.

Some embodiments disclosed herein overcome or at least ameliorate the above-described problems that can arise from playback device clock rate drift. In some embodiments, individual playback devices lock onto a clock rate of a time source (regardless of whether the playback device is playing audio content) such that the clock rate of any two arbitrary playback devices is identical or at least very close to the same clock rate. When all the playback devices in a playback group are locked onto the clock rate of a time source, the group of playback devices is able to play audio content together in synchrony as long as they all have sufficiently close playback start times. Additionally, playback devices can tolerate larger differences in starting playback times if the clock rates of the playback devices are identical or at least very close to the same clock rate.

In some embodiments, a playback device locks onto a clock rate of a time source by capturing clock time measurements that are spaced far apart relative to an expected error in the clock time measurements.

For example, if the playback device captures two clock time measurements that are 5 seconds apart but have an expected error of +/−1 second, then measurements are not very useful for determining a clock rate because the expected error range (+/−1 second) is large relative to sampling rate (5 seconds). In this specific example, the clock rate determined from the two clock time measurements could be up to 40% different from the actual clock rate of the time source from which the playback device obtained the two clock time measurements.

But if the playback device captures two clock time measurements that are one hour apart with an expected error of +/−1 second, then the two measurements are much more useful for determining a clock rate because the error range (+/−1 second) is small relative to the sampling rate (3600 seconds). In this specific example, the clock rate determined from the two clock time measurements could be up to 0.056% different from the actual clock rate of the time source from which the playback device obtained the two clock time measurements.

Accordingly, in some embodiments, a playback device uses clock time measurements that are spaced far apart relative to the expected measurement error to calculate a clock rate for the time source providing time information to the playback device. The playback device can compare the calculated clock rate with its actual clock rate to determine a clock rate error. This calculated clock rate error is provided to a state estimator (e.g., a Kalman filter or other state estimator) that estimates a clock rate error for the playback device based on one or more of the calculated clock rate errors. The playback device can use this estimate of the clock rate error to control the clock rate of its local clock.

In operation, a playback device can obtain clock time measurements from a variety of time sources for use in controlling its clock rate based on an estimated clock rate error determined according to the procedure summarized above.

For example, in some embodiments a playback device can obtain clock time measurements from a remote server (e.g., a cloud server) via an Internet connection. In this example, the playback device can periodically (e.g., every hour, every few hours, etc.) or perhaps semi periodically (e.g., a few times an hour a few times a day, and so on) figure out a difference in a clock time at the playback device and a clock time provided by the remove server (e.g., using NTP or SNTP). Although these clock time measurements might be "noisy" (e.g., plagued by latency and jitter resulting in an expected error rate of up to a few seconds) obtaining the clock time measurements sufficiently far apart relative to the expected error in each clock time measurement enables the playback device to estimate a sufficiently accurate clock rate from the clock time measurements.

In other embodiments, a playback device can obtain clock time measurements from its alternating current (AC) power input. In this scenario, a stationary playback device that is plugged into a standard wall outlet receives AC power from the power grid at a defined frequency (e.g., 60 Hz, 50 Hz, etc.). While the frequency can vary randomly throughout the day (e.g., caused by power disruptions), the total number of cycles over the course of a day tends to be fairly consistent. Accordingly, the playback device can count out a predetermined number of cycles, identify the amount of time that should have passed given the number of detected cycles (e.g., 1 hour, 3 hours, 12 hours, and so on), and use that identified time as a reference to determine whether a local clock at the playback device is drifting ahead or behind relative to the AC power input.

In still further embodiments, a playback device can obtain clock time measurements from a global positioning system (GPS) signal. In this scenario, a GPS receiver(s) at the playback device outputs data indicative of a current time. For example, GPS receivers typically output a pulse-per-second (PPS) GPS time reference. The playback device can use that GPS time reference to determine whether a local clock at the playback device is drifting ahead or behind relative to the GPS time reference signal. In some embodiments, the output of the GPS receiver at the playback device includes a timestamp along with the location (e.g., date/time, longitude, & latitude). The typical format of the message is defined by the National Marine Electronics Association (NMEA). In some embodiments, the playback device uses the timestamp data in these NMEA GPS messages to obtain clock time information.

In still further embodiments, a playback device can obtain clock time measurements from a modem (e.g., a cable modem), router, or another piece of network equipment. Modems and other network equipment typically include a very accurate clock to facilitate communication over a Wide-Area-Network (WAN). In some embodiments, a playback device can query a modem, router, or another piece of network equipment to obtain clock time information, e.g., by using Network Time Protocol (NTP), Simple Network Time Protocol (SNTP), Precision Time Protocol (PTP) or some other protocol. While the ability to provide clock time information in response to NTP, SNTP, PTP or other protocols may not be readily available in some residential cable modems or routers, the core functions already exist within such devices because they have a generally accurate clock and a network address (e.g., an IP address) that can be reached by devices on the network, including playback devices connected thereto.

In still further embodiments, a playback device can obtain clock time measurements from a wireless power transmitter. Wireless power transmitters may comprise those devices configured to transmit power wirelessly (e.g., via inductance, resonance, radiation, etc.) to one or more other devices (e.g., one or more playback devices). In some embodiments, the playback device may extract timing information from the wireless power being transmitted. For example, the playback device may derive clock time measurements from the wireless power being transmitted from the wireless power transmitter. For instance, in some implementations, wireless power may be transmitted to the playback device via light of a particular wavelength and frequency. In these implementations, the playback device may use the frequency of the light as a reference to determine whether a local clock at the playback device is drifting ahead or behind. In another example, the wireless power transmitted may embed timing information into the wireless power being transmitted to the playback device. In this example, the playback device may extract the timing information embedded in the received wireless power. For instance, in some implementations, wireless power may be transmitted to the playback device via light of a particular wavelength and frequency. In these implementations, the wireless power transmitter may incorporate timing information into the wireless power being transmitted by, for example, modulating the frequency and/or phase of the light. Accordingly, the playback device may extract the timing information from the received wireless power by tracking frequency and/or phase changes of the light.

In scenarios where multiple clock rate references are available to a playback device, the playback device (individually or perhaps in cooperation with the group coordinator and/or a controller device configured to control the playback devices individually and/or as a playback group) may choose primary, secondary, tertiary, etc. time sources to use based on a hierarchy of time sources, e.g., ranked by accuracy. In some example embodiments, the playback devices in a playback group may be configured to use a GPS signal, cloud server, wireless power, and AC power as primary, secondary, tertiary, and quaternary time references. Alternatively, in some embodiments, a playback device merges the results of each timing reference. For example, the playback device determines a clock rate error relative to each reference (GPS signal, cloud server, and AC signal), combines the clock rate errors for each reference (e.g., averaged, weighted average based on confidence, etc.) to form a single (potentially more accurate) clock rate error. Examples using fewer than four or more sources are contemplated as well.

In some embodiments, if no timing reference is available (e.g., the playback device is not connected to the Internet, does not have a GPS capability, is not connected to AC power, etc.), the playback device may store the last set of timing settings (e.g., settings for a sample rate converter, voltage applied to a VXCO, etc.) in memory and continue to use those settings for controlling its clock rate. The deviation in the clock rate of a given crystal oscillator from a "true clock rate" (barring environment changes) stays generally the same over the life of the product. Accordingly, the last state of these timing settings is likely to be fairly accurate. These settings may also be used when the device first starts up from a powered-off state (e.g., in the context of a portable device that may power cycle frequently).

In some embodiments, the playback device monitors the clock rate error and one or more parameters (e.g., temperature, etc.) over time to find a relationship between the monitored parameters and the clock rate error for the given crystal oscillator. The playback device employs this identified relationship in place of a set of static settings in the event that a clock rate reference is not available.

Aspects of the above-described embodiments and variations thereof are described in further detail herein with reference to FIGS. 7-10.

V. Technical Features

In some embodiments, at least some aspects of the technical solutions derive from the technical structure and organization of the audio content, the playback timing, and the clock timing information that the playback devices use to play audio content from audio sources in synchrony with each other or in some other groupwise fashion, including how playback devices generate playback timing based on clock timing and play audio content based on playback timing and clock timing. Further, at least some aspects of the technical solutions derive from the aspects of time information received from time sources, including how playback devices use time information from time sources to estimate their clock rate error and control their local clocks based on clock rate error estimates.

Therefore, to aid in understanding certain aspects of the disclosed technical solutions, certain technical details of the time information, the audio content, playback timing, and clock timing information, as well as how playback devices generate and/or use playback timing and clock timing for playing audio content are described below. Except where noted, the technical details of the audio content, playback timing, and clock timing information described below are the same or at least generally the same for the examples shown and described herein with reference to FIGS. 7-10.

a. Audio Content

Audio content (e.g., audio content 740 in FIG. 7) may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In some embodiments, a group coordinator (sometimes referred to as a "sourcing" device) obtains any of the aforementioned types of audio content from an audio source via an interface on the group coordinator, e.g., one of the group coordinator's wired or wireless data network interfaces, a "line-in" analog interface, a digital audio interface, or any other interface suitable for receiving audio content in digital or analog format now known or later developed.

An audio source (e.g., audio source 704 in FIG. 7) is any system, device, or application that generates, provides, or otherwise makes available any of the aforementioned audio content to a group coordinator and/or playback device. Examples of audio sources include streaming media (audio, video) services, digital media servers or other computing systems, voice assistant services (VAS), televisions, cable set-top-boxes, streaming media players (e.g., AppleTV, Roku, gaming console), CD/DVD players, doorbells, intercoms, telephones/smartphones, tablets, or any other source of audio content now known or later developed.

As mentioned earlier, a playback device that receives or otherwise obtains audio content from an audio source for playback and/or distribution to other playback devices in a playback group is sometimes referred to herein as the group coordinator or "sourcing" device for the playback group.

One function of the group coordinator of a playback group in some embodiments is to process received audio content for playback and/or distribution to group members of the playback group for groupwise playback. In some embodiments, the group coordinator transmits the processed audio content to all the other group members in the playback group. In some embodiments, the group coordinator transmits the audio content to a multicast network address (e.g., an IP multicast address or other type of multicast address), and all the group member playback devices configured to play the audio content (i.e., the group members of the playback group) receive the audio content via that multicast address. In some embodiments, the group coordinator broadcasts the audio content on a wireless channel and the group members in the playback group receive the broadcast. For example, in some embodiments, the group coordinator transmits the audio content to the group members via Connectionless Slave Broadcast (CSB) Bluetooth transmission or other type of broadcast or multicast transmission.

In some embodiments, the group coordinator receives audio content from an audio source in digital form, e.g., via a stream of packets. In some embodiments, individual packets in the stream have a sequence number or other identifier that specifies an ordering of the packets. In operation, the group coordinator uses the sequence number or other identifier to detect missing packets and/or to reassemble the packets of the stream in the correct order before performing further processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out. For example, in some embodiments, the group coordinator receives audio content from an audio source via the Internet. In some embodiments, the group coordinator receives audio content from an audio source via an Advanced Audio Distribution Profile (A2DP) Bluetooth link.

In some embodiments, individual packets from an audio source may include both a timestamp and a sequence number. The timestamp is used to place the incoming packets of audio content in the correct order, and the sequence number is mainly used to detect packet losses. In operation, the sequence numbers increase by one for each Real-time Transport Protocol (RTP) packet transmitted from the audio source, and timestamps increase by the time "covered" by an RTP packet. In instances where a portion of audio content is split across multiple RTP packets, multiple RTP packets may have the same timestamp.

In some embodiments, the group coordinator does not change the sequence number or identifier (or timestamp, if applicable) of a received packet during processing. But in some embodiments, the group coordinator may reorder at least a first set of packets in a packet stream received from an audio source (an inbound stream) based on each packet's sequence identifier, extract audio content from the received packets, reassemble a bitstream of audio content from the received packets, and then repacketize the reassembled bitstream into an outbound set of packets (an outbound stream), where packets in the outbound stream have sequence numbers and/or timestamps that differ from the sequence numbers and/or timestamps of the packets in the first set of packets (or first stream).

In some embodiments, individual packets in the outbound stream may be a different length (i.e., shorter or longer) than individual packets in the inbound stream. In some embodiments, reassembling a bitstream from the incoming packet stream and then subsequently repacketizing the reassembled bitstream into a different set of packets facilitates uniform processing and/or transmission of audio content by the group coordinator and uniform processing by the group members that receive the audio content from the group coordinator.

However, for some delay-sensitive audio content, reassembly and repacketization may be undesirable, and therefore, in some embodiments, the group coordinator may not perform reassembly and repacketization for some (or all) audio content that it receives before playing the audio content and/or transmitting the audio content to other playback devices/group members.

b. Playback Timing

In some embodiments, the playback devices disclosed and described herein use playback timing (e.g., playback timing 744 in FIG. 7) to play audio content in synchrony with each other. An individual playback device can generate playback timing and/or playback audio content according to playback timing, based on the playback device's configuration in the playback group. The sourcing playback device (acting as a group coordinator) that generates the playback timing for audio content also transmits that generated playback timing to all the playback devices that are configured to play the audio content (the group members).

In some embodiments, the group coordinator transmits playback timing separately from the audio content. For example, in some embodiments, the group coordinator (i) transmits audio content to the group members via Connectionless Slave Broadcast (CSB) Bluetooth transmission and (ii) transmits playback timing for the audio content via a Bluetooth or Bluetooth Low Energy (BLE) transmission.

In some embodiments, the group coordinator transmits the playback timing to all the group members by transmitting the playback timing to a multicast network address for the playback group, and all the group members receive the playback timing via the playback group's multicast address. In some embodiments, the group coordinator transmits the playback timing to each group member by transmitting the playback timing to each group member's unicast network address.

In some embodiments, the playback timing is generated for individual frames (or packets) of audio content. In some embodiments, the audio content is packaged in a series of frames (or packets) where individual frames (or packets) comprise a portion of the audio content. In some embodiments, the playback timing for the audio content includes a playback time for each frame (or packet) of audio content. In some embodiments, the playback timing for an individual frame (or packet) is included within the frame (or packet), e.g., in the header of the frame (or packet), in an extended header of the frame (or packet), and/or in the payload portion of the frame (or packet). But as described earlier, in some embodiments, the group coordinator transmits playback timing for one or more individual frames separately from the audio content.

In some embodiments, the playback time for an individual frame (or packet) is identified within a timestamp or other indication. In such embodiments, the timestamp (or other indication) represents a time to play the one or more portions of audio content within that individual frame (or packet).

In operation, when the playback timing for an individual frame (or packet) is generated, the playback timing for that individual frame (or packet) is a future time relative to a current clock time of a reference clock at the time that the playback timing for that individual frame (or packet) is generated. As described in more detail below, the reference clock can be a "local" clock at the group coordinator or a "remote" clock at a separate network device, e.g., another playback device, a computing device, or another network device configured to provide clock timing for use by playback devices to generate playback timing and/or playback audio content.

In operation, a playback device tasked with playing particular audio content will play the portion(s) of the particular audio content within an individual frame (or packet) at the playback time specified by the playback timing for that individual frame (or packet), as adjusted to accommodate for differences between the clock timing information and a clock at the playback device that is tasked with playing the audio content, as described in more detail below.

c. Reference Clock Timing

The playback devices disclosed and described herein use clock timing (e.g., clock timing 752 in FIG. 7) from a reference clock to generate playback timing (e.g., playback timing 744 in FIG. 7) for audio content (e.g., audio content 742 in FIG. 7) and to play audio based on the audio content and the generated playback timing.

In some embodiments, the group coordinator uses clock timing from a reference clock (e.g., a device clock, a digital-to-audio converter clock, a playback time reference clock, or any other clock) to generate playback timing for audio content that the group coordinator receives from an audio source. The reference clock can be a "local" clock at the group coordinator or a "remote" clock at a separate network device, e.g., another playback device, a computing device, or another network device configured to provide clock timing for use by (i) a group coordinator to generate playback timing and/or (ii) the group coordinator and group members to play back audio content.

The reference clock is preferably one of (i) a reference clock that is on the same local area network (LAN) as the group coordinator and group members or (ii) a reference clock that is connected (directly or indirectly) to the group coordinator and/or group members via a local wireless transmission link (e.g., a Bluetooth or similar short range wireless link). However, the reference clock in some embodiments may be a remote reference clock, i.e., a reference clock that provides clock timing information via a wide area network (WAN) or Internet connection rather than a reference clock on the same LAN as the group coordinator and group members or otherwise connected to one or more of the group coordinator and/or group members via local wireless transmission links (e.g., Bluetooth or similar).

In some embodiments, all of the playback devices tasked with playing particular audio content in synchrony (i.e., all the group members in a playback group) use the same clock timing from the same reference clock to play back that particular audio content in synchrony with each other. In some embodiments, playback devices use the same clock timing to play audio content that was used to generate the playback timing for the audio content.

In some embodiments, the device that generates the clock timing also transmits the clock timing to all the playback devices that need to use the clock timing for generating playback timing and/or playing back audio content. In some embodiments, the device that generates the clock timing (e.g., the group coordinator in some embodiments) transmits the clock timing to a multicast network address, and all the playback devices configured to generate playback timing and/or play audio content (e.g., the group members, and perhaps the group coordinator too if the group coordinator is not the device generating the clock timing) receive the clock timing via that multicast address. In some embodiments, the device that generates the clock timing alternatively transmits the clock timing to each unicast network address of each playback device in the playback group.

In some embodiments, the device that generates the clock timing is a playback device configured to operate as the group coordinator for the playback group. And in operation, the group coordinator of the playback group transmits the clock timing to all the group members of the playback group. In some embodiments, the group coordinator transmits the clock timing to all playback group members via a multicast network address. In some embodiments, the group coordinator transmits clock timing to individual group members via each group member's unicast network address. In some embodiments, the coordinator transmits clock timing to individual group members via a Bluetooth or Bluetooth Low Energy (BLE) transmission, or via any other transmission scheme suitable for transmitting clock timing information now known or later developed. And in some embodiments, the group coordinator and the group members all use the clock timing and the playback timing to play audio content in a groupwise manner. In some embodiments, the group coordinator and the group members all use the clock timing and the playback timing to play audio content in synchrony with each other.

d. Time Information

As mentioned above and described further herein, playback devices according to some embodiments use time information (e.g., time information 750 in FIG. 7 or time information 810 in FIG. 8) from a time source (e.g., time source 702 in FIG. 7 or time source 802 in FIG. 8) to synchronize their local clocks to a clock time and a clock rate of a clock at the time source (e.g., 702 or 802). This time information is different from clock timing (e.g., 752 or 838) from a reference clock that playback devices use to generate playback timing for audio content and to play audio based on the audio content. In some embodiments, a playback device may receive time information (e.g., 750 or 810) from a time source much less frequently than a playback device may receive clock timing (e.g., 752 or 838) from a reference clock used for groupwise playback of audio content in a playback group.

For example, in some embodiments, a group coordinator (i) uses time information (e.g., time information 750 or 810) to synchronize its local clock time and local clock rate to the clock time and/or clock rate of a clock at a time source, and (ii) uses its local clock (which has been synchronized to the time source) to generate clock timing (e.g., clock timing 752 or 838) that the group coordinator uses for generating playback timing (e.g., playback timing 744) and for playing back audio in synchrony with other group members. Similarly, for embodiments where a group member synchronizes its local clock to a time source, the group member (i) uses time information (e.g., 750 or 810) to synchronize its local clock time and/or local clock rate to the clock time and clock rate of a clock at the time source, and (ii) uses clock timing information received from the group coordinator (or other timing reference) to adjust the playback timing received from the group coordinator (or other timing reference) when playing back audio content in synchrony with the group coordinator and other group members.

In this manner, playback devices in some embodiments use time information to synchronize their clock times and clock rates to a time source over a comparatively long timeframe while using clock timing from a reference clock to synchronize playback of audio content over a comparatively short timeframe. This arrangement enables playback devices to play audio content in synchrony with each other even when the clock time and/or clock rate of an individual playback device may have drifted out of synchronization with the time source.

Because the time information and the clock timing are generally used for different purposes, in some embodiments, the time information has a different structure and format than the clock timing.

For example, because the time information is used for synchronization of clock rates (and perhaps clock times) between a playback device and a time source (typically a remote time source) over a comparatively long time frame, it may be advantageous for the time information to include information about the quality of the time information, the source of the time information, a location of the time source providing the time information, and perhaps other information that may be useful for a playback device to use when determining whether to select time information received from one time source over time information received from another time source, at least in scenarios where multiple time sources are available. This type of information may be particularly useful for a group coordinator to evaluate the quality of time information received from public time sources and perhaps the reliability of a particular time source over time.

By contrast, because the clock timing is used for synchronizing playback of audio content by playback devices within a playback group over a comparatively short timeframe (e.g., during a synchronous playback session) where all the playback devices are known to each other, detailed information about the source, location, quality, reliability of the clock timing may not be as important. As a result, in some embodiments, the size of messages comprising clock timing may be smaller than the size of messages comprising time information.

e. Generating Playback Timing by the Group Coordinator

In some embodiments, the group coordinator: (i) generates playback timing (e.g., 744) for audio content (e.g., 742) based on clock timing (e.g., 752 or 838) from a local clock at the group coordinator, and (ii) transmits the generated playback timing to all the other group members in the playback group. In operation, when generating playback timing for an individual frame (or packet), the group coordinator adds a "timing advance" to the current clock time of a local clock at the group coordinator that the group coordinator is using for generating the playback timing.

In some embodiments, the "timing advance" is based on an amount of time that is greater than or equal to the sum of (i) the network transit time required for frames and/or packets comprising audio content transmitted from the group coordinator to arrive at all the other group members and (ii) the amount of time required for all the other group members to process received frames/packets from the group coordinator for playback.

In some embodiments, the group coordinator determines a timing advance by sending one or more test packets to one or more (or perhaps all) of the other group members, and then receiving test response packets back from those one or more group members. In some embodiments, the group coordinator and the one or more group members negotiate a timing advance via multiple test and response messages. In some embodiments with more than two group members, the group coordinator determines a timing advance by exchanging test and response messages with all of the group members, and then setting a timing advance that is sufficient for the group member having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined, or at least constant for the duration of a synchronous playback session. In other embodiments, the group coordinator can change the timing advance in response to a request from a group member indicating that a greater timing advance is required (e.g., because the group member is not receiving packets comprising portions of audio content until after one or more other group members have already played the portions of audio content) or a shorter timing advance would be sufficient (e.g., because the group member is buffering more packets comprising portions of audio content than necessary to provide consistent, reliable playback).

As described in more detail below, all the playback devices in a playback group configured to play the audio content in synchrony will use the playback timing and the clock timing to play the audio content in synchrony with each other.

f. Generating Playback Timing with Clock Timing from a Remote Reference Clock

In some embodiments, the group coordinator may generate playback timing for audio content based on clock timing from a remote clock at another network device, e.g., another playback device, another computing device (e.g., a smartphone, laptop, media server, cloud server, or other computing device or computing system configurable to provide clock timing sufficient for use by the group coordinator to generate playback timing and/or playback audio content). Generating playback timing based on clock timing from a remote clock at another network device is more complicated than generating playback timing based on clock timing from a local clock in embodiments where the same clock timing is used for both (i) generating playback timing and (ii) playing audio content based on the playback timing.

In embodiments where the group coordinator generates playback timing for audio content based on clock timing from a remote clock, the playback timing for an individual frame (or packet) is based on (i) a "timing offset" between (a) a local clock at the group coordinator that the group coordinator uses for generating the playback timing and (b) the clock timing information from the remote reference clock, and (ii) a "timing advance" based on an amount of time that is greater than or equal to the sum of (a) the network transit time required for packets transmitted from the group coordinator to arrive at the group members and (b) the amount of time required for all of those group members to process frames and/or packets comprising audio content received from the group coordinator for playback.

For an individual frame (or packet) containing a portion(s) of the audio content, the group coordinator generates playback timing for that individual frame (or packet) by adding the sum of the "timing offset" and the "timing advance" to a current time of the local clock at the group coordinator that the group coordinator uses to generate the playback timing for the audio content. In operation, the "timing offset" may be a positive or a negative offset, depending on whether the local clock at the group coordinator is ahead of or behind the remote clock providing the clock timing. The "timing advance" is a positive number because it represents a future time relative to the local clock time, as adjusted by the "timing offset."

By adding the sum of the "timing advance" and the "timing offset" to a current time of the local clock at the group coordinator that the group coordinator is using to generate the playback timing for the audio content, the group coordinator is, in effect, generating the playback timing relative to the remote clock.

In some embodiments, and as described above, the "timing advance" is based on an amount of time that is greater than or equal to the sum of (i) the network transit time required for frames and/or packets comprising audio content transmitted from the group coordinator to arrive at all other group members and (ii) the amount of time required for all the other group members to process received frames/packets from the sourcing playback device for playback.

In some embodiments, the group coordinator determines a timing advance via signaling between the group coordinator and one or more group members, as described previously. Further, in some embodiments, the timing advance is less than about 50 milliseconds, less than about 20-30 milliseconds, or less than about 10 milliseconds, depending on the audio content playback latency requirements because different audio content may have different latency requirements. For example, audio content having associated video content may have lower latency requirements than audio content that does not have associated video content because audio content associated with video content must be synchronized with its corresponding video content whereas audio content that is not associated with video content need not be synchronized with any corresponding video content. In some embodiments, the timing advance remains constant after being determined, or at least constant for the duration of a playback session. And in some embodiments, the group coordinator can change the timing advance based on further signaling between the group coordinator (generating the playback timing) and one or more group members (that are using the playback timing to play audio content).

As described in more detail below, all the playback devices configured to play the audio content in synchrony will use the playback timing and the clock timing to play the audio content in synchrony with each other.

g. Playing Audio Content Using Local Playback Timing and Local Clock Timing

In some embodiments, the group coordinator is configured to play audio content in synchrony with one or more group members. And if the group coordinator is using clock timing from a local clock at the group coordinator to generate the playback timing, then the group coordinator will play the audio content using locally-generated playback timing and the locally-generated clock timing. In operation, the group coordinator plays an individual frame (or packet) comprising portions of the audio content when the local clock that the group coordinator used to generate the playback timing reaches the time specified in the playback timing for that individual frame (or packet).

For example, recall that when generating playback timing for an individual frame (or packet), the group coordinator adds a "timing advance" to the current clock time of the reference clock used for generating the playback timing. In this instance, the reference clock used for generating the playback timing is a local clock at the group coordinator. So, if the timing advance for an individual frame is, for example, 30 milliseconds, then the group coordinator plays the portion (e.g., a sample or set of samples) of audio content in an individual frame (or packet) 30 milliseconds after creating the playback timing for that individual frame (or packet).

In this manner, the group coordinator plays audio content by using locally-generated playback timing and clock timing from a local reference clock at the group coordinator. By playing the portion(s) of the audio content of an individual frame and/or packet when the clock time of the local reference clock reaches the playback timing for that individual frame or packet, the group coordinator plays that portion(s) of the audio content in that individual frame and/or packet in synchrony with other group members in the playback group.

h. Playing Audio Content Using Local Playback Timing and Remote Clock Timing

As mentioned earlier, in some embodiments, a group coordinator generates playback timing for audio content based on clock timing from a remote clock, i.e., a clock at another network device separate from the group coordinator, e.g., another playback device, or another computing device (e.g., a smartphone, laptop, media server, or other computing device configurable to provide clock timing sufficient for use by a playback device to generate playback timing and/or playback audio content). Because the group coordinator used clock timing from the remote clock to generate the playback timing for the audio content, the group coordinator also uses the clock timing from the remote clock to play the audio content. In this manner, the group coordinator plays audio content using the locally-generated playback timing and the clock timing from the remote clock.

Recall that, in embodiments where the group coordinator generates playback timing for audio content based on clock timing from a remote clock, the group coordinator generates the playback timing for an individual frame (or packet) based on (i) a "timing offset" based on a difference between (a) a local clock at the group coordinator and (b) the clock timing information from the remote clock, and (ii) a "timing advance" comprising an amount of time that is greater than or equal to the sum of (a) the network transit time required for frames/packets transmitted from the group coordinator to arrive at all the group members and (b) the amount of time required for all of the group members to process frames and/or packets comprising audio content received from the group coordinator for playback. And further recall that the group coordinator transmits the generated playback timing to all of the group members in the playback group tasked with playing the audio content in synchrony.

In this scenario, to play an individual frame (or packet) of audio content in synchrony with the one or more other group members, the group coordinator subtracts the "timing offset" from the playback timing for that individual frame (or packet) to generate a "local" playback time for playing audio based on the audio content within that individual frame (or packet). After generating the "local" playback time for playing the portion(s) of the audio content within the individual frame (or packet), the group coordinator plays the portion(s) of the audio content in the individual frame (or packet) when the local clock that the group coordinator is using to play the audio content reaches the "local" playback time for that individual frame (or packet). By subtracting the "timing offset" from the playback timing to generate the "local" playback time for an individual frame, the group coordinator effectively plays the portion(s) of audio content in that frame/packet with reference to the clock timing from the remote clock.

i. Playing Audio Content Using Remote Playback Timing and Local Clock Timing

Recall that, in some embodiments, the group coordinator transmits the audio content and the playback timing for the audio content to one or more group members. If the group member that receives (i.e., the receiving group member) the audio content and playback timing from the group coordinator is the same group member that provided clock timing information to the group coordinator that the group coordinator used for generating the playback timing, then the receiving group member in this instance plays audio content using the playback timing received from the group coordinator (i.e., remote playback timing) and the group member's own clock timing (i.e., local clock timing). Because the group coordinator used clock timing from a clock at the receiving group member to generate the playback timing, the receiving group member also uses the clock timing from its local clock to play the audio content. In this manner, the receiving group member plays audio content using the remote playback timing (i.e., from the group coordinator) and the clock timing from its local clock (i.e., its local clock timing).

To play an individual frame (or packet) of the audio content in synchrony with the group coordinator (and every other group member that receives the playback timing from the group coordinator and clock timing from the receiving group member), the receiving group member (i) receives the frames (or packets) comprising the portions of the audio content from the group coordinator, (ii) receives the playback timing for the audio content from the group coordinator (e.g., in the frame and/or packet headers of the frames and/or packets comprising the portions of the audio content or perhaps separately from the frames and/or packets comprising the portions of the audio content), and (iii) plays the portion(s) of the audio content in the individual frame (or packet) when the local clock that the receiving group member used to generate the clock timing reaches the playback time specified in the playback timing for that individual frame (or packet) received from the group coordinator.

Because the group coordinator uses the "timing offset" (which is the difference between the clock timing at the receiving group member and the clock timing at the group coordinator in this scenario) when generating the playback timing, and because this "timing offset" already accounts for differences between timing at the group coordinator and the receiving group member, the receiving group member in this scenario plays individual frames (or packets) comprising portions of the audio content when the receiving group member's local clock (that was used to generated the clock timing) reaches the playback time for an individual frame (or packet) specified in the playback timing for that individual frame (or packet).

And because the receiving group member plays frames (or packets) comprising portions of the audio content according to the playback timing, and because the group coordinator plays frames (or packets) comprising the same portions of the audio content according to the playback timing and the determined "timing offset," the receiving group member and the group coordinator play frames (or packets) comprising the same audio content in synchrony, i.e., at the same time or at substantially the same time.

j. Playing Audio Content Using Remote Playback Timing and Remote Clock Timing

Recall that, in some embodiments, the sourcing playback device (e.g., which in many cases may be the group coordinator) transmits the audio content and the playback timing for the audio content to one or more other playback devices in the synchrony group. And further recall that, in some embodiments, the network device providing the clock timing can be a different device than the playback device providing the audio content and playback timing (i.e., the sourcing playback device, which in many cases may be the group coordinator). Playback devices that receive the audio content, the playback timing, and the clock timing from one or more other devices are configured to playback the audio content using the playback timing from the device that provided the playback timing (i.e., remote playback timing) and clock timing from a clock at the device that provided the clock timing (i.e., remote clock timing). In this manner, the receiving group member in this instance plays audio content by using remote playback timing and remote clock timing.

To play an individual frame (or packet) of the audio content in synchrony with every other playback device tasked with playing audio content in the playback group, the receiving playback device (i) receives the frames (or packets) comprising the portions of the audio content, (ii) receives the playback timing for the audio content (e.g., in the frame and/or packet headers of the frames and/or packets comprising the portions of the audio content or perhaps separately from the frames and/or packets comprising the portions of the audio content), (iii) receives the clock timing, and (iv) plays the portion(s) of the audio content in the individual frame (or packet) when the local clock that the receiving playback device uses for audio content playback reaches the playback time specified in the playback timing for that individual frame (or packet), as adjusted by a "timing offset."

In operation, after the receiving playback device receives clock timing, the receiving device determines a "timing offset" for the receiving playback device. This "timing offset" comprises (or at least corresponds to) a difference between the "reference" clock that was used to generate the clock timing and a "local" clock at the receiving playback device that the receiving playback device uses to play the audio content. In operation, each playback device that receives the clock timing from another device calculates its own "timing offset" based on the difference between its local clock and the clock timing, and thus, the "timing offset" that each playback device determines is specific to that particular playback device.

In some embodiments, when playing back the audio content, the receiving playback device generates new playback timing (specific to the receiving playback device) for individual frames (or packets) of audio content by adding the previously determined "timing offset" to the playback timing for each received frame (or packet) comprising portions of audio content. With this approach, the receiving playback device converts the playback timing for the received audio content into "local" playback timing for the receiving playback device. Because each receiving playback device calculates its own "timing offset," each receiving playback device's determined "local" playback timing for an individual frame is specific to that particular playback device.

And when the "local" clock that the receiving playback device is using for playing back the audio content reaches the "local" playback time for an individual frame (or packet), the receiving playback device plays the audio content (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the receiving playback device plays frames (or packets) comprising portions of the audio content according to the playback timing as adjusted by the "timing offset" relative to the clock timing, and because the device providing the playback timing generated the playback timing for those frames (or packets) relative to the clock timing and plays frames (or packets) comprising the same portions of the audio content according to the playback timing and its determined "timing offset," the receiving playback device and the device that provided the playback timing (e.g., the group coordinator in some embodiments) play frames (or packets) comprising the same portions of the audio content in synchrony with each other, i.e., at the same time or at substantially the same time.

VI. Example Embodiments

Figure 7:
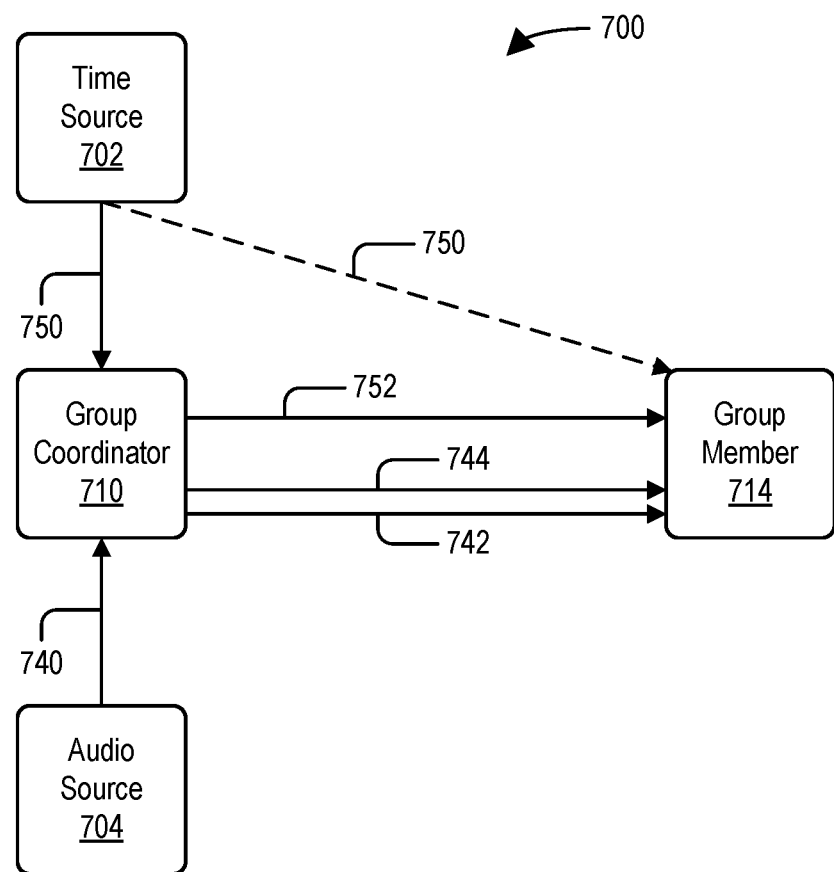
FIG. 7 shows an example configuration of a media playback group configured for clock rate synchronization according to some embodiments.

FIG. 7 shows an example configuration of a media playback group 700 configured for clock rate synchronization according to some embodiments.

Playback group 700 includes a group coordinator 710 and a group member 714. Although playback group 700 shows only a single group member 714, embodiments can include two, three, four, five, or many more group members (not shown). The group coordinator 710 receives (i) time information 750 from time source 702 and (ii) audio content 740 from audio source 704.

Time source 702 may comprise any of the time sources disclosed herein, including but not limited to, a cloud server, a GPS time source, an AC power connection, a wireless power transmitter, a modem, a router, another piece of networking equipment, or any other source of timing now known or later developed that is sufficient to provide timing information to playback devices.

Audio source 704 may comprise any of the audio sources disclosed herein, including but not limited to streaming audio sources available via the Internet or any other source of audio content now known or later developed. In operation, group coordinator 710 receives audio content 740 from audio source 704. The audio content 740 may comprise any of the audio content disclosed herein, including but not limited to streaming audio content available via the Internet from streaming audio sources.

The group coordinator 710 and the group member 714 in playback group 700 are or at least comprise playback devices. Group coordinator 710 and group member 714 may comprise any of the playback devices disclosed herein.

In playback group 700, time source 702 provides time information 750 to the group coordinator 710. In some embodiments, time source 702 may additionally provide the time information 750 to the group member 714, too.

In some embodiments, the time information 750 comprises an indication of the current time at the time source 702. The structure of the time information 750 can vary depending on the time source 702. In operation, the time information 750 may take any form or structure that is sufficient for a playback device (e.g., group coordinator 710 or group member 714) to determine a timing error measurement (described further herein).

In operation, the group coordinator 710 receives the time information 750 via a first plurality of clock timing messages from the time source 702 at a first message receipt rate. In some embodiments, the group coordinator 710 requests the time information 750 from the time source 702, and the time source 702 transmits the time information 750 to the group coordinator 710 in response to the group coordinator's 710 request. In this manner, the first message receipt rate depends at least in part on the rate at which the group coordinator 710 requests the time information 750 from the time source 702.

In some embodiments, the time source 702 is configured to transmit the time information 750 to the group coordinator 710 according to some transmission schedule. In some embodiments, the time source 702 transmits (e.g., via unicast, multicast, broadcast, or similar) time information 750 on a regular or semi-regular basis, and individual playback devices (e.g., group coordinator 710 or group member 714) are configured to receive the time information 750 from the time source 702. For example, a playback device can subscribe to receive the time information 750 from the time source 702. In some embodiments, a playback device can request that a time source 702 transmit time information 750 to the playback device according to a transmission schedule.

A mentioned earlier, time information 750 received from a remote time source 702, e.g., a cloud server, can often have high latency (travel time from the time source 702 to the playback device) and high jitter (fluctuations in the receipt rate of messages) because of the nature of Internet transmissions. Latency and jitter introduce problems when the playback device tries to closely match its clock time to the clock time indicated by the time information 750 received from the time source 702. First, latency causes the playback device to receive the time information 750 from the time source 702 perhaps hundreds of milliseconds (or even a few seconds) after the time source 702 transmits the time information 750. And jitter makes predicting a timing offset to compensate for the latency difficult.

To overcome or at least ameliorate the problems caused by latency and jitter of time information 750 received from a remote time source 702, a playback device can use multiple messages comprising time information 750 received from the time source 702 to estimate the actual time of the time source 702 and to match a clock rate at the playback device with the clock rate of a clock at the time source 702 providing the time information 750.

In embodiments where the time source 702 transmits the time information 750 to playback devices on a regular or semi-regular basis, the time source 702 transmits the time information 750 to playback devices (e.g., group coordinator 710 and perhaps group member 714, too) at a message rate. For example, the time source 702 in some embodiments is configured to transmit time information 750 about once every 10-15 minutes to about once every 1-5 hours. Alternatively, if the time source 702 transmits time information 750 more frequently (e.g., once every few seconds, once a minute, once every few minutes), then the playback device can be configured to select one time information 750 message every 10-15 minutes or one time information 750 message every 1-5 hours to use for determining a clock time and adjusting a clock rate as described herein. In embodiments where the playback device requests time information 750 from the time source 702, the playback device may be configured to send a request to the time source 702 about once every 10-15 minutes to about once every 1-5 hours, thereby causing the playback device to receive the time information 750 about once every 10-15 minutes to about once every 1-5 hours in response to requests the playback device has sent to the time source 702.

In operation, the group coordinator 710 uses the time information 750 received from the time source 702 to synchronize a local clock at the group coordinator 710 to the clock time and/or clock rate of a clock at the time source 702 that was used to generate the time information 750. The group coordinator 710 in turn uses its local clock to generate both (i) clock timing 752 and (ii) playback timing 744 for audio content 742. And in operation, the group coordinator 710 transmits the audio content 742, clock timing 752, and the playback timing 744 for the audio content 742 to the group member 714. And the group coordinator 710 and group member 714 use the audio content 742, clock timing 752, and playback timing 744 for the audio content 742 to play audio in a groupwise fashion (including in synchrony) with each other as described previously.

Figure 8:
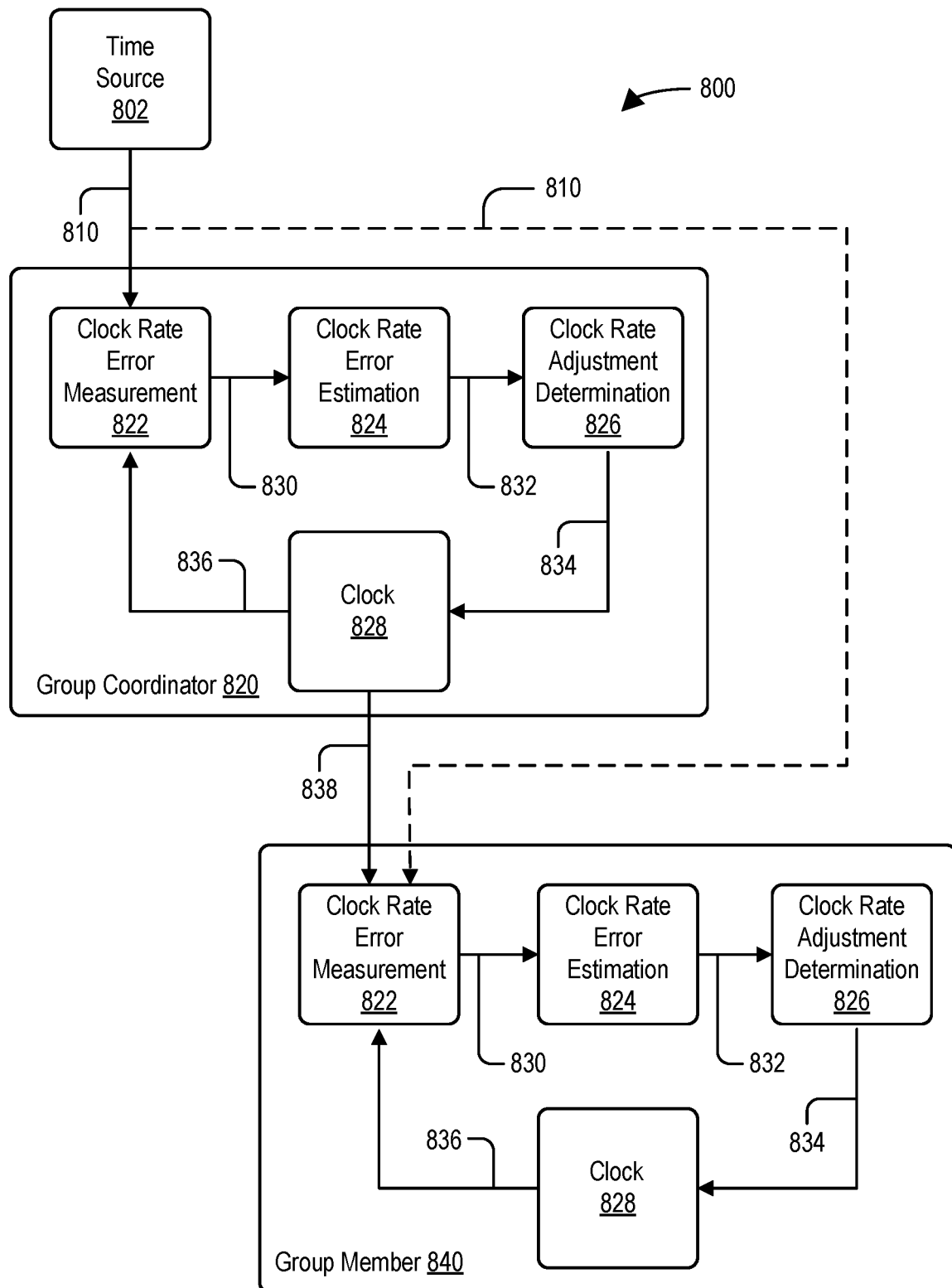
FIG. 8 shows aspects of how playback devices in a playback group receive and process time information to facilitate clock time and/or clock rate synchronization according to some embodiments.

FIG. 8 shows aspects of how playback devices 820, 840 in a playback group 800 receive and process time information 810 to facilitate clock time and/or clock rate synchronization according to some embodiments. The playback devices 820, 840 in playback group 800 may be same as or similar to any of the playback devices disclosed herein, including but not limited to playback devices 710, 714 (FIG. 7).

Playback group 800 includes a group coordinator 820 and a group member 840. Although playback group 800 is shown with only two playback devices, the features and functions described with reference to playback group 800 are equally applicable to playback groups with more than two playback devices. Each of the group coordinator 820 and the group member 840 comprise a clock rate error measurement subsystem 822, a clock rate error estimation subsystem 824, a clock rate adjustment determination subsystem 826, and a clock subsystem 828. In some embodiments, the clock subsystem 828 comprises a component of a playback device's local clock that the playback device uses for (i) generating clock timing (e.g., clock timing 752 in FIG. 7 or clock timing 838 in FIG. 8), (ii) playback timing (e.g., playback timing 744 in FIG. 7), and/or (iii) playing audio content (e.g., audio content 742 in FIG. 7) in synchrony with one or more other playback devices.

Each of the clock rate error measurement subsystem 822, clock rate error estimation subsystem 824, clock rate adjustment determination subsystem 826, and clock subsystem 828 may comprise one or more components of hardware, software, firmware, and/or any combination thereof. Similarly, although the subsystems 822, 824, 826, and 828 are shown as separate components in FIG. 8 for illustration purposes, in practice one or more of the subsystems 822, 824, 826, and/or 828 can be combined into a single hardware, software, and/or firmware component.

Group coordinator 822 receives time information 810 from time source 802. In some embodiments, group coordinator 822 receives the time information 810 via a plurality of messages comprising the time information 810. The messages arrive at some rate, sometimes referred to herein as an arrival rate or receipt rate. In some example embodiments, the arrival rate (or receipt rate) of the time information 810 is between about one message every 10-15 minutes to about one message every 1-5 hours. However, other receipt rates are possible, too. In some embodiments, the group coordinator 822 may receive the time information 810 at a fairly constant rate, but sample the time information 810 at a sampling rate of between about one message every 10-15 minutes to about one message every 1-5 hours. Other sample rates are possible, too.

Regardless of the receipt or sampling rate, the group coordinator 822 provides the time information 810 to clock rate error measurement subsystem 822. In some embodiments, the clock rate error measurement subsystem 822 measures a clock rate error by comparing a clock rate of the time source 802 with a clock rate of a local clock at the group coordinator 822. The local clock at the group coordinator 822 may be a physical clock or a virtual clock (e.g., a clock generated by using a physical clock and some mapping function that relates the physical clock to the virtual clock). For example, in some embodiments, the local clock at the group coordinator 822 comprises a voltage-controlled crystal oscillator (VXCO), e.g., within the clock subsystem 828, where the clock rate of the VXCO can be adjusted by changing a voltage applied to the oscillator.

Similarly, in some embodiments, the local clock at the group coordinator 822 comprises a virtual clock that tracks time based on a mapping between the virtual clock and a physical clock (e.g., a physical clock comprising an oscillator, such as a crystal oscillator, in the clock subsystem 828), where, for example, X ticks on the physical clock correspond to Y ticks of the virtual clock, where X and Y can be any real number.

In some embodiments, the clock rate error measurement subsystem 822 measures the clock rate error by comparing the time indicated in a first time information 810 message with the time indicated in a second time information 810 message in view of the time the group coordinator 820 received the first time information 810 message (based on the group coordinator's 820 local clock) and the time the group coordinator 820 received the second time information 810 message. By comparing the difference between the times indicated in the time information 810 messages with the difference between the arrival times of the time information 810 messages, the group coordinator 820 can determine whether and the extent to which the clock rate of the local clock at the group coordinator 820 differs from the clock at the time source 802.

In some embodiments, the clock rate error measurement subsystem 822 may additionally or alternatively compare the difference between the arrival times of time information 810 messages with a clock rate input 836 from the clock subsystem 828, where the clock rate input 836 reflects an actual clock rate of a physical clock (e.g., a VCXO), or alternatively, a clock rate of a virtual clock based on the physical clock.

In some embodiments, the clock rate error measurement subsystem 822 calculates a new clock rate error after receiving a new clock time in a time information 810 message. In embodiments where the group coordinator 822 receives the time information 810 at a fairly constant rate but samples the time information 810 at a sampling rate, the clock rate error measurement subsystem 822 calculates a new clock rate error after a new clock time sample. In some embodiments, the clock rate error measurement subsystem 822 may calculate a new clock rate error based on more than two time information 810 messages or more than two time information 810 samples.

After measuring the clock rate error, the clock rate error measurement subsystem 822 provides the determined clock rate error 830 to the clock rate error estimation subsystem 824. In some embodiments, the clock rate error estimation subsystem 824 comprises at least one of a Kalman filter, a linear Kalman filter, a moving horizon estimator, or similar state estimation mechanisms or procedures now known or later developed. In operation, the clock rate error estimation subsystem 824 estimates a clock rate error state 832 based on one or more clock rate error measurements 830 received from the clock rate error measurement subsystem 822.

After estimating the clock rate error state 832, the clock rate error estimation subsystem 824 provides the clock rate error state 832 to the clock rate adjustment determination subsystem 826. If the clock rate adjustment determination subsystem 826 determines that the clock rate should be adjusted, the clock rate adjustment determination subsystem 826 adjusts the clock rate of the clock within the clock subsystem 828 via signal 834. In some embodiments, signal 834 comprises a voltage control signal for controlling the VXCO to adjust the clock rate of the VXCO to account for the clock rate error state 832 estimated by the clock rate error estimation subsystem 824. In some embodiments, signal 834 comprises one or more instructions that cause the clock subsystem 828 to adjust the clock rate of a virtual clock to account for the estimated clock rate error state 832.

In some embodiments, and as described in detail herein, the playback group 800 uses the clock of the clock subsystem 828 of the group coordinator 820 as the reference clock for groupwise playback of audio content by the playback group 800. This reference clock is the clock that the group coordinator 820 uses to generate clock timing 838 that the playback group 800 uses for playing audio in a groupwise manner.

In particular, referring back to FIG. 7, recall that in some embodiments, the group coordinator 710 uses its local clock to generate clock timing 752. The clock rate (and perhaps the clock time) of the local clock at the group coordinator 710 is synchronized to the clock rate (and perhaps the clock time) of a clock at the time source 702. The group coordinator 710 uses the clock timing 752 from its local clock to generate playback timing 744 for audio content 742. The group coordinator 710 transmits the audio content 742, the playback timing 744 for the audio content 742, and the clock timing 752 to the group member 720 (and other group members (not shown)).

In operation, the group coordinator 710 transmits messages comprising the clock timing 752 to the group member 720 at a message transmission rate much greater than the rate at which the group coordinator 710 receives messages comprising time information 750 from the time source 702. Similarly, for embodiments where the group member 714 also receives time information 750 from the time source and synchronizes the clock time and/or clock rate of its local clock to the clock time and/or clock rate of the time source 702, the rate at which the group member 714 receives the clock timing 752 from the group coordinator 710 is much greater than the rate at which the group member 714 receives time information 750 from the time source 702.

Further, the group coordinator 710 and the group member 720 (and all other group members (not shown)) use the clock timing 752 and the playback timing 744 to play audio based on the audio content 742 in a groupwise manner (including in synchrony) with each other.

Similarly, in FIG. 8, the group coordinator 820 uses its local clock (e.g., a physical clock or a virtual clock of the clock subsystem 828) to generate clock timing information 838. The clock rate (and perhaps the clock time) of the local clock at the group coordinator 820 is synchronized to the clock rate (and perhaps the clock time) of a clock at the time source 802. The group coordinator 820 uses the clock timing 838 from its local clock to generate playback timing for audio content that the group coordinator 820 plays in a groupwise manner with the group member 840. The group coordinator 820 transmits the audio content, the playback timing for the audio content, and the clock timing 838 to the group member 840 (and other group members (not shown)).

In operation, the group coordinator 820 transmits the messages comprising the clock timing 838 to the group member 840 at a message transmission rate much greater than the rate at which the group coordinator 820 receives messages comprising time information 810 from the time source 802. And the group coordinator 820 and the group member 840 (and all other group members (not shown)) use the clock timing 838 and the playback timing to play audio based on the audio content in a groupwise manner (including in synchrony) with each other.

In some embodiments, the group member 840 may also be configured to additionally receive the time information 810 from the time source 802. And in such embodiments, the group member 840 may synchronize the clock rate (and perhaps its clock time) of its local clock (e.g., clock subsystem 828 of group member 840) to the time source 802 in the same way that the group coordinator 820 synchronizes its clock rate (and perhaps clock time) of its local clock (e.g., clock subsystem 828 of group member 820) to the time source 802 as described above. In some embodiments, the rate at which the group member 840 receives clock timing 838 from the group coordinator 820 is between 10 to 10,000 times faster than the rate at which the group member 840 receives the time information 810 from the time source 802. For example, in some embodiments, the group member 840 receives messages comprising clock timing 838 from the group coordinator 820 at a rate of about one message every few hundred milliseconds to every few seconds whereas the group member 840 receives messages comprising the time information 810 from the time source 802 at a rate of about one message every 10-15 minutes to about 1-5 hours.

Alternatively, rather than synchronizing the clock rate (and perhaps clock time) of its local clock to the time source 802, in some embodiments the group member 840 may instead synchronize the clock rate (and perhaps its clock time) of its local clock (e.g., clock subsystem 828 of group member 840) to the clock rate (and perhaps clock time) of the local clock of the group coordinator 820 (e.g., clock subsystem 828 of group coordinator 820).

To synchronize the clock rate (and perhaps clock time) of its local clock to the group coordinator 820, the group member 840 uses the clock timing 838 received from the group coordinator 820 as an input the clock rate error measurement subsystem 822 at the group member 840. Thus, in such embodiments, the group member 840 uses the clock timing 838 from the group coordinator 820 to both (i) play audio content in synchrony with the group coordinator 840 (and perhaps additional playback devices) and (ii) synchronize its clock rate (and perhaps clock time) to the group coordinator 820.

In some embodiments, the group member 840 may use both the clock timing 838 and the time information 810 to control its clock rate (and perhaps clock time). Because clock timing 838 from the group coordinator 820 is used for synchronous playback, the rate at which the group member 840 receives messages comprising clock timing 838 from the group coordinator 820 is substantially greater than the rate at which the group member 840 receives messages comprising time information 810 from the time source 802. Additionally, if the group member 840 and the group coordinator 820 are on the same LAN (or at least in communication with each other via a short-range wireless link), transmissions from the group coordinator 820 to the group member 840 will tend to have substantially lower latency and jitter than transmissions from the time source 802 to the group member 840, at least in scenarios where the time source 802 transmits the time information 810 to the group member 840 via the Internet. As a result, in some embodiments where the clock rate error estimation subsystem 824 comprises a Kalman filter (or variants thereof), the Kalman filter (or similar) may weight clock rate errors 830 measured by the clock rate error measurement subsystem 822 based on the clock timing 838 more heavily than clock rate errors 830 measured by the clock rate error measurement subsystem 822 based on the time information 810 when generating a clock rate error estimate 832.

VII. Example Methods

Figure 9:
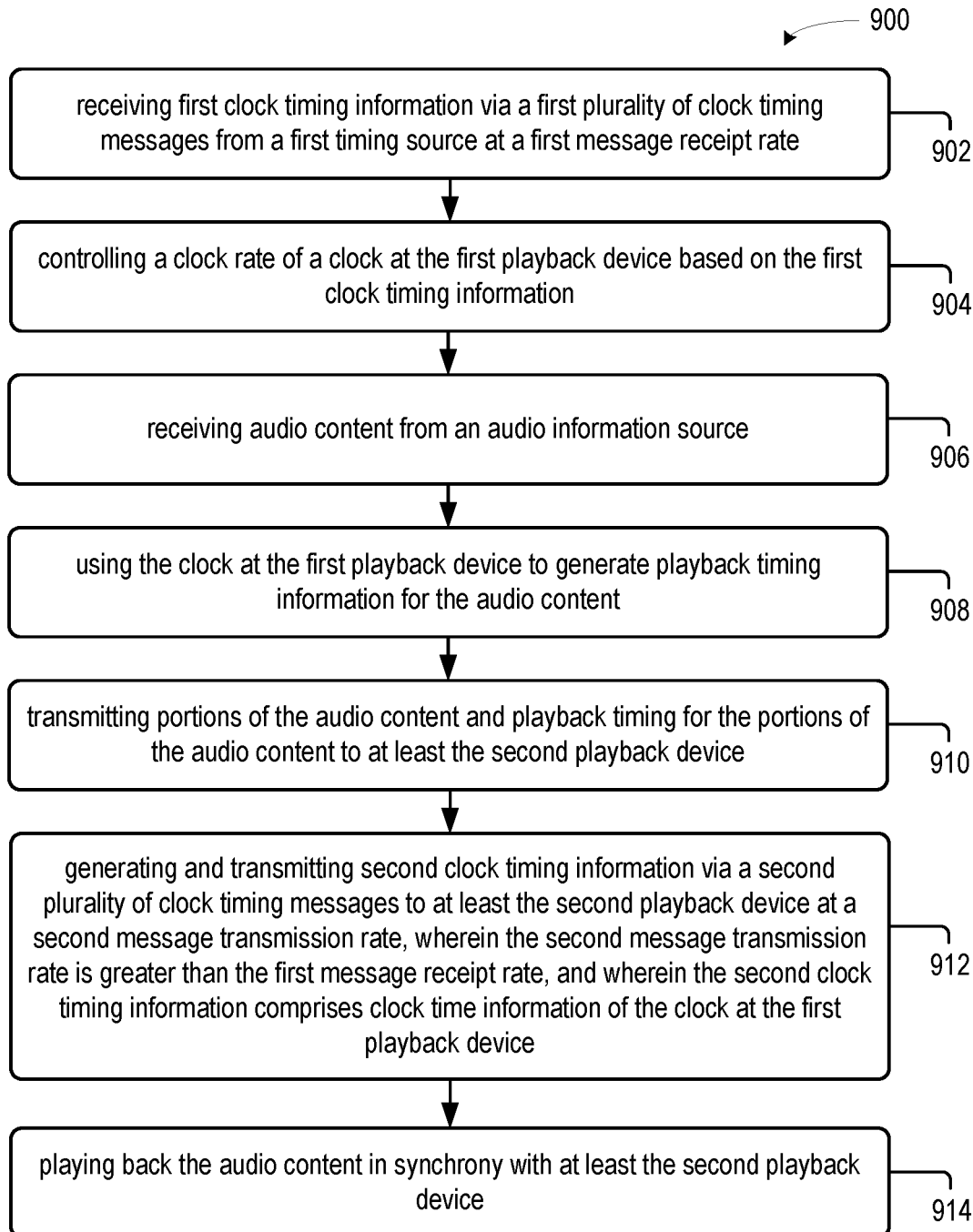
FIG. 9 shows an example method 900 according to some embodiments.

FIG. 9 shows an example method 900 according to some embodiments.

Method 900 may be performed by any of the playback devices disclosed and described herein, including but not limited to a playback device configured to operate as a group coordinator, such as group coordinator 710 shown and described with reference to FIG. 7.

Method 900 begins at step 902, which includes receiving first clock timing information via a first plurality of clock timing messages from a first time source at a first message receipt rate. In some embodiments, the first time source comprises one of: (i) a remote cloud server, (ii) an alternating current (AC) power input, (iii) a global positioning system (GPS) satellite, (iv) a wireless power transmitter, or (v) a modem with an Internet connection.

Next, method 900 advances to step 904, which includes controlling a clock rate of a clock at the first playback device based on the first clock timing information. In some embodiments, the clock at the first playback comprises a virtual clock generated based on a physical clock and at least one relationship between the physical clock and the virtual clock, and wherein adjusting the clock rate comprises modifying the at least one relationship between the physical clock and the virtual clock.

In some embodiments, the clock rate of the clock at the first playback device based on the first clock timing information at step 904 includes generating at least one timing error measurement, wherein generating the at least one timing error measurement is based on a difference between (i) a duration of time between a clock time of the first time source associated with a first clock timing message and a clock time of the first time source associated with a second clock timing message, and (ii) a duration of time between a clock time of the first playback device when the first clock timing message was received and a clock time of the first playback device when the second clock timing message was received. In some embodiments, the clock rate of the clock at the first playback device based on the first clock timing information at step 904 further includes estimating a clock rate error for the clock at the first playback device based on the at least one timing error measurement and adjusting the clock rate of the clock at the first playback device based on the estimated clock rate error.

For some embodiments where step 904 includes generating at least one timing error measurement, the step of generating the at least one timing error measurement in step includes generating a plurality of timing error measurements including the at least one timing measurement and wherein estimating the clock rate error for the clock at the first playback device comprises estimating the clock rate error for the clock at the first playback device based on the plurality of timing measurements using a state estimator. In some embodiments, the state estimator includes a Kalman filter. In some embodiments, the state estimate includes an extended Kalman filter. In some embodiments, the state estimator includes a linear Kalman filter. In some embodiments, the state estimator includes a moving horizon estimator.

Next, method 900 advances to step 906, which includes receiving audio content from an audio source.

Next, method 900 advances to step 908, which includes using the clock at the first playback device to generate playback timing information for the audio content. In some embodiments, using the clock at the first playback device to generate playback timing information for the audio content at step 908 includes for an individual portion of the audio content, generating a future playback time for the individual portion of the audio content by adding a timing advance to a current clock time of the clock at the first playback device.

In some embodiments, determining the timing advance based on an amount of time that is greater than or equal to a sum of (i) a network transit time for frames and/or packets comprising audio content transmitted from the first playback device to arrive at all other playback devices configured to use the playback timing for playing the audio content in synchrony and (ii) an amount of time for all the other playback devices configured to use that playback timing for synchronous playback to process received frames/packets from the first playback device for playback.

Next, method 900 advances to step 910, which includes transmitting portions of the audio content and playback timing for the portions of the audio content to at least the second playback device.

Next, method 900 advances to step 912, which includes generating and transmitting second clock timing information via a second plurality of clock timing messages to at least the second playback device at a second message transmission rate, wherein the second message transmission rate is greater than the first message receipt rate, and wherein the second clock timing information comprises clock time information of the clock at the first playback device. In some embodiments, the second message receipt rate is between 10 times faster than the first message receipt rate and 10,000 times faster than the first message receipt rate.

Next, method 900 advances to step 914, which includes playing back the audio content in synchrony with at least the second playback device. In some embodiments, playing back the audio content in synchrony with at least the second playback device at step 914 includes using the clock time information of the clock at the first playback device and the playback timing for the portions of the audio content to playback the portions of the audio content in synchrony with at least the second playback device. In some embodiments, using the clock time information of the clock at the first playback device and the playback timing for the portions of the audio content to playback the portions of the audio content in synchrony with at least the second playback device includes, for an individual portion of the audio content, playing the individual portion of the audio content when the clock at the first playback device reaches the future playback time for the individual portion of the audio content.

In some embodiments, method 900 additionally includes, while playing back the audio content in synchrony with at least the second playback device, detecting an interruption in the receipt of the first clock timing information from the first time source at the first message receipt rate. And in response to detecting the interruption in the receipt of the first clock timing information from the first time source at the first message receipt rate, (i) discontinuing controlling the clock rate of the clock at the first playback device based on the first clock timing information, (ii) continuing to generate and transmit the second clock timing information to at least the second playback device at the second message transmission rate, and (iii) continuing playing back the audio content in synchrony with at least the second playback device.

And some embodiments of method 900 further include, after detecting the interruption in the receipt of the first clock timing information from the first time source at the first message receipt rate, the functions further comprise: (A) while playing back the audio content in synchrony with at least the second playback device, detecting a resumption in receipt of the first clock timing information from the first time source; and (B) in response to detecting the resumption in receipt of the first clock timing information from the first time source, (i) resuming controlling the clock rate of the clock at the first playback device based on the first clock timing information, (ii) continuing to generate and transmit the second clock timing information to at least the second playback device at the second message transmission rate, and (iii) continuing playing back the audio content in synchrony with at least the second playback device.

Figure 10:
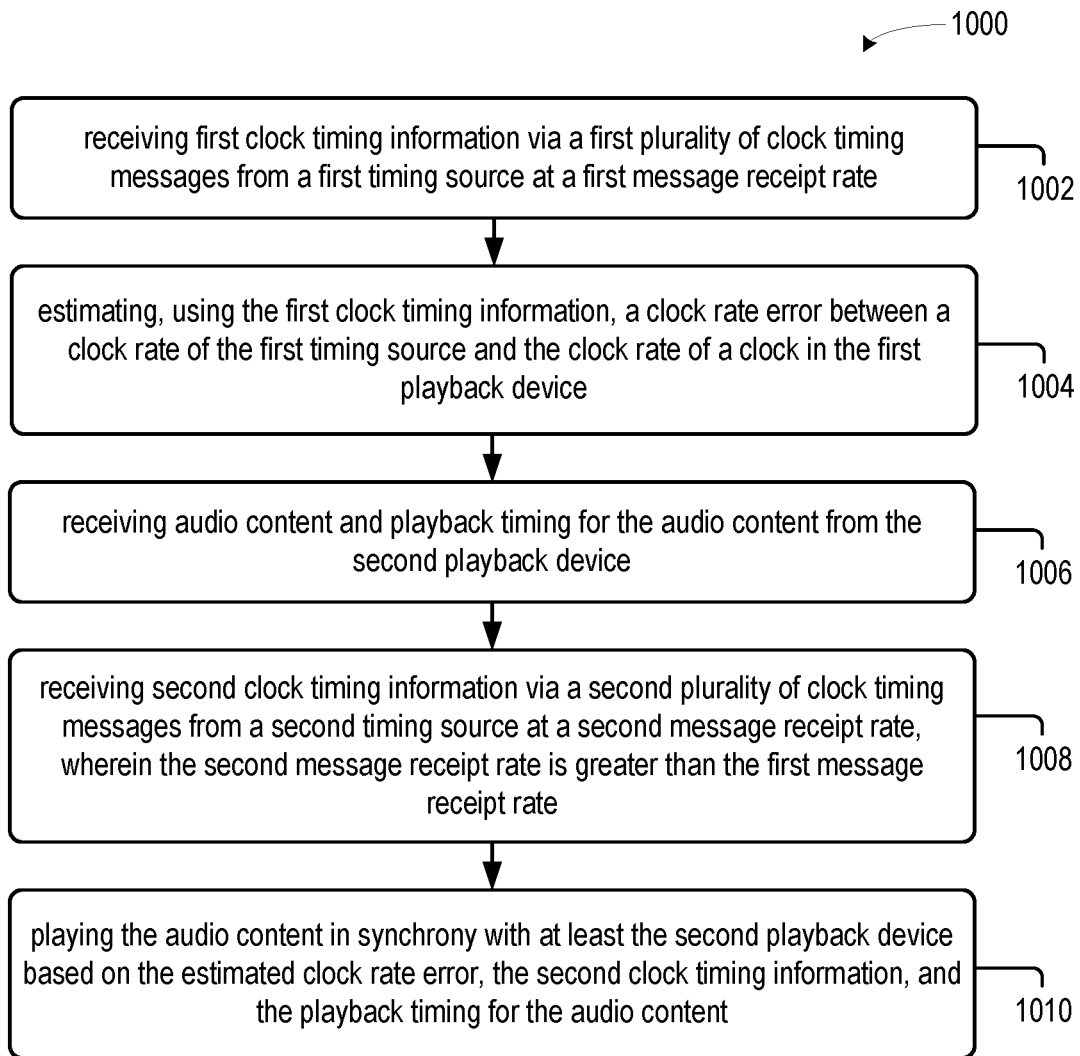
FIG. 10 shows an example method 1000 according to some embodiments.

FIG. 10 shows an example method 1000 according to some embodiments.

Method 1000 may be performed by any of the playback devices disclosed and described herein, including but not limited to a playback device configured to operate as a group member, such as group member 714 shown and described with reference to FIG. 7.

Method 1000 begins at step 1002, which includes receiving first clock timing information via a first plurality of clock timing messages from a first time source at a first message receipt rate. In some embodiments, the first time source comprises one of (i) a remote cloud server, (ii) an alternating current (AC) power input, (iii) a global positioning system (GPS) satellite, (iv) a wireless power transmitter, or (v) a modem with an Internet connection.

Next, method 1000 advances to step 1004, which includes estimating, using the first clock timing information, a clock rate error between a clock rate of the first time source and the clock rate of a clock in the first playback device.

Next, method 1000 advances to step 1006, which includes receiving audio content and playback timing for the audio content from the second playback device.

Next, method 1000 advances to step 1008, which includes receiving second clock timing information via a second plurality of clock timing messages from a second time source at a second message receipt rate, wherein the second message receipt rate is greater than the first message receipt rate. In some embodiments, the second message receipt rate is between 10 times faster than the first message receipt rate and 10,000 times faster than the first message receipt rate. In some embodiments, the second time source comprises one of (i) a computing device configured to control the first playback device, (ii) the second playback device, or (iii) a third playback device.

Next, method 1000 advances to step 1010, which includes playing the audio content in synchrony with at least the second playback device based on the estimated clock rate error, the second clock timing information, and the playback timing for the audio content.

In some embodiments, playing the audio content in synchrony with at least a second playback device based on the estimated clock rate error, the second clock timing information, and the playback timing for the audio content at step 1010 includes determining a timing offset based on a difference between (i) a clock time of the clock at the first playback device and (ii) a clock time of a clock at the second time source indicated in at least one of the second plurality of clock timing messages received from the second time source.

In some embodiments, playing the audio content in synchrony with at least a second playback device based on the estimated clock rate error, the second clock timing information, and the playback timing for the audio content at step 1010 includes, for an individual portion of audio content, determining an adjusted playback time for the individual portion of audio content based on the determined timing offset, and then playing an individual portion of audio content when the clock at the first playback device reaches the adjusted playback time for the individual portion of audio content.

And in some embodiments, playing the audio content in synchrony with at least a second playback device based on the estimated clock rate error, the second clock timing information, and the playback timing for the audio content at step 1010 additionally includes adjusting a playback rate of the audio content based on the estimated clock rate error.

VIII. Conclusion

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

EXAMPLE FEATURES (Feature 1) A first playback device comprising: one or more processors; one or more communication interfaces configured to facilitate communication via one or more data networks; and one or more non-transitory computer-readable media comprising program instructions that are executable by the at least one processor such that the first playback device is configured to: while communicatively coupled with a data network via the one or more communication interfaces, receive first clock timing information via a first plurality of clock timing messages from a first time source at a first message receipt rate; control a clock rate of a clock at the first playback device based on the first clock timing information; receive audio content from an audio source; use the clock at the first playback device to generate playback timing information for the audio content; transmit portions of the audio content and playback timing for the portions of the audio content to at least a second playback device; generate and transmit second clock timing information via a second plurality of clock timing messages to at least the second playback device at a second message transmission rate, wherein the second message transmission rate is greater than the first message receipt rate, and wherein the second clock timing information comprises clock time information of the clock at the first playback device; and play back the audio content in synchrony with at least the second playback device.

(Feature 2) The first playback device of feature 1, wherein the program instructions that are executable by the at least one processor such that the playback device is configured to control the clock rate of the clock at the first playback device based on the first clock timing information comprises program instructions that are executable by the at least one processor such that the playback device is configured to: generate at least one timing error measurement based on a difference between (i) a duration of time between a clock time of the first time source associated with a first clock timing message and a clock time of the first time source associated with a second clock timing message, and (ii) a duration of time between a clock time of the first playback device when the first clock timing message was received and a clock time of the first playback device when the second clock timing message was received; estimate a clock rate error for the clock at the first playback device based on the at least one timing error measurement; and adjust the clock rate of the clock at the first playback device based on the estimated clock rate error.

(Feature 3) The first playback device of feature 2, wherein the program instructions that are executable by the at least one processor such that the playback device is configured to generate the at least one timing error measurement comprises program instructions that are executable by the at least one processor such that the playback device is configured to generate a plurality of timing error measurements including the at least one timing measurement.

(Feature 4) The first playback device of feature 3, wherein the program instructions that are executable by the at least one processor such that the playback device is configured to estimate the clock rate error for the clock at the first playback device comprises program instructions that are executable by the at least one processor such that the playback device is configured to estimate the clock rate error for the clock at the first playback device based on the plurality of timing measurements using a state estimator.

(Feature 5) The first playback device of feature 1, wherein the second message receipt rate is between 10 times faster than the first message receipt rate and 10,000 times faster than the first message receipt rate.

(Feature 6) The first playback device of feature 1, wherein the first time source comprises one of: (i) a remote cloud server, (ii) an alternating current (AC) power input, (iii) a global positioning system (GPS) satellite, (iv) a wireless power transmitter, or (v) a modem with an Internet connection.

(Feature 7) The first playback device of feature 1, wherein the at least one non-transitory computer-readable medium further comprises program instructions that are executable by the at least one processor such that the playback device is configured to: while the audio content is played back in synchrony with at least the second playback device, detect an interruption in the receipt of the first clock timing information from the first time source at the first message receipt rate; and after detection of the interruption in the receipt of the first clock timing information, (i) discontinue controlling the clock rate of the clock at the first playback device based on the first clock timing information, (ii) continue to generate and transmit the second clock timing information to at least the second playback device at the second message transmission rate, and (iii) continue playing back the audio content in synchrony with at least the second playback device.

(Feature 8) The first playback device of feature 7, wherein the at least one non-transitory computer-readable medium further comprises program instructions that are executable by the at least one processor such that the playback device is configured to: after detection of the interruption in the receipt of the first clock timing information and while the audio content is played back in synchrony with at least the second playback device, detect a resumption in receipt of the first clock timing information from the first time source; and after detection of the resumption in receipt of the first clock timing information from the first time source, (i) resume control of the clock rate of the clock at the first playback device based on the first clock timing information, (ii) continue to generate and transmit the second clock timing information to at least the second playback device at the second message transmission rate, and (iii) continue playback of the audio content in synchrony with at least the second playback device.

(Feature 9) The first playback device of feature 1, wherein the program instructions that are executable by the at least one processor such that the playback device is configured to use the clock at the first playback device to generate playback timing information for the audio content comprises program instructions that are executable by the at least one processor such that the playback device is configured to: for an individual portion of the audio content, generate a future playback time for the individual portion of the audio content at least in part by adding a timing advance to a current clock time of the clock at the first playback device.

(Feature 10) The first playback device of feature 9, wherein the at least one non-transitory computer-readable medium further comprises program instructions that are executable by the at least one processor such that the playback device is configured to: determine the timing advance based on an amount of time that is greater than or equal to a sum of (i) a network transit time for frames and/or packets comprising audio content transmitted from the first playback device to arrive at all other playback devices configured to use the playback timing for playing the audio content in synchrony and (ii) an amount of time for all the other playback devices configured to use that playback timing for synchronous playback to process received frames/packets from the first playback device for playback.

(Feature 11) The first playback device of feature 9, wherein the program instructions that are executable by the at least one processor such that the playback device is configured to play back the audio content in synchrony with at least the second playback device comprises program instructions that are executable by the at least one processor such that the playback device is configured to: use the clock time information of the clock at the first playback device and the playback timing for the portions of the audio content to playback the portions of the audio content in synchrony with at least the second playback device.

(Feature 12) The first playback device of feature 11, wherein the program instructions that are executable by the at least one processor such that the playback device is configured to use the clock time information of the clock at the first playback device and the playback timing for the portions of the audio content to playback the portions of the audio content in synchrony with at least the second playback device comprises program instructions that are executable by the at least one processor such that the playback device is configured to: for an individual portion of the audio content, play the individual portion of the audio content when the clock at the first playback device reaches the future playback time for the individual portion of the audio content.

(Feature 13) The first playback device of feature 1, wherein the clock at the first playback comprises a virtual clock generated based on a physical clock and at least one relationship between the physical clock and the virtual clock.

(Feature 14) The first playback device of feature 13, wherein the program instructions that are executable by the at least one processor such that the playback device is configured to adjust the clock rate comprises program instructions that are executable by the at least one processor such that the playback device is configured to modify the at least one relationship between the physical clock and the virtual clock.

(Feature 15) A first playback device comprising: one or more processors; one or more communication interfaces configured to connect the first playback device to a second playback device; and one or more non-transitory computer-readable media with instructions stored therein, wherein the instructions, when executed, cause the first playback device to perform functions comprising: while communicatively coupled with a data network via the one or more communication interfaces, receive first clock timing information via a first plurality of clock timing messages from a first time source at a first message receipt rate; estimate, using the first clock timing information, a clock rate error between a clock rate of the first time source and the clock rate of a clock in the first playback device; receive audio content and playback timing for the audio content from the second playback device; receive second clock timing information via a second plurality of clock timing messages from a second time source at a second message receipt rate, wherein the second message receipt rate is greater than the first message receipt rate; and play the audio content in synchrony with at least the second playback device based on the estimated clock rate error, the second clock timing information, and the playback timing for the audio content.

(Feature 16) The first playback device of feature 15, wherein the program instructions that are executable by the at least one processor such that the playback device is configured to play the audio content in synchrony with at least a second playback device based on the estimated clock rate error, the second clock timing information, and the playback timing for the audio content comprises program instructions that are executable by the at least one processor such that the playback device is configured to: determine a timing offset based on a difference between (i) a clock time of the clock at the first playback device and (ii) a clock time of a clock at the second time source indicated in at least one of the second plurality of clock timing messages received from the second time source; for an individual portion of audio content, determine an adjusted playback time for the individual portion of audio content based on the determined timing offset; and play an individual portion of audio content when the clock at the first playback device reaches the adjusted playback time for the individual portion of audio content.

(Feature 17) The first playback device of feature 15, wherein the program instructions that are executable by the at least one processor such that the playback device is configured to play the audio content in synchrony with at least a second playback device based on the estimated clock rate error, the second clock timing information, and the playback timing for the audio content comprises program instructions that are executable by the at least one processor such that the playback device is configured to: adjust a playback rate of the audio content based on the estimated clock rate error.

(Feature 18) The first playback device of feature 15, wherein the second message receipt rate is between 10 times faster than the first message receipt rate and 10,000 times faster than the first message receipt rate.

(Feature 19) The first playback device of feature 15, wherein the first time source comprises one of (i) a remote cloud server, (ii) an alternating current (AC) power input, (iii) a global positioning system (GPS) satellite, (iv) a wireless power transmitter, or (v) a modem with an Internet connection.

(Feature 20) The first playback device of feature 15, wherein the second time source comprises one of (i) a computing device configured to control the first playback device, (ii) the second playback device, or (iii) a third playback device.

(Feature 21) One or more non-transitory computer-readable media comprising program instructions that are executable by the at least one processor such that the first playback device is configured to: operate in a group coordinator mode wherein the first playback device is configured to: (i) receive first clock timing information via a first plurality of clock timing messages from a first time source at a first message receipt rate, (ii) control a clock rate of a clock at the first playback device based on the first clock timing information, (iii) receive audio content from an audio source, (iv) use the clock at the first playback device to generate playback timing information for the audio content, (v) transmitting portions of the audio content and playback timing for the portions of the audio content to at least a second playback device, (vi) generate and transmit second clock timing information via a second plurality of clock timing messages to at least the second playback device at a second message transmission rate, wherein the second message transmission rate is greater than the first message receipt rate, and wherein the second clock timing information comprises clock time information of the clock at the first playback device, and (vii) play back the audio content in synchrony with at least the second playback device; and operate in a group member mode wherein the first playback device is configured to: (i) receive first clock timing information via a first plurality of clock timing messages from a first time source at a first message receipt rate, (ii) estimate, using the first clock timing information, a clock rate error between a clock rate of the first time source and the clock rate of a clock in the first playback device, (iii) receive audio content and playback timing for the audio content from the second playback device, (iv) receive second clock timing information via a second plurality of clock timing messages from a second time source at a second message receipt rate, wherein the second message receipt rate is greater than the first message receipt rate, and (v) play the audio content in synchrony with at least the second playback device based on the estimated clock rate error, the second clock timing information, and the playback timing for the audio content.

(Feature 22) The one or more non-transitory computer-readable media of feature 21, wherein the second message receipt rate is between 10 times faster than the first message receipt rate and 10,000 times faster than the first message receipt rate.

The invention claimed is:

1. A first playback device comprising:
   at least one processor;
   one or more communication interfaces configured to facilitate communication via one or more data networks; and
   at least one tangible, non-transitory computer-readable medium comprising program instructions that are executable by the at least one processor such that the first playback device is configured to:
   while communicatively coupled with a data network via the one or more communication interfaces, receive first clock timing information via a first plurality of clock timing messages from a first time source at a first message receipt rate;
   for audio content received via the one or more communication interfaces, generate playback timing for the audio content based at least in part on the first clock timing information;
   transmit portions of the audio content and playback timing for the portions of the audio content to at least a second playback device;
   generate and transmit second clock timing information via a second plurality of clock timing messages to at least the second playback device at a second message transmission rate, wherein the second message transmission rate is different from the first message receipt rate, and wherein the second clock timing information is based at least in part on the first clock timing information; and
   play back the audio content in synchrony with at least the second playback device.

2. The first playback device of claim 1, wherein the program instructions that are executable by the at least one processor such that the first playback device is configured to generate playback timing for the audio content based at least in part on the first clock timing information comprise program instructions that are executable by the at least one processor such that the first playback device is configured to:
   control a clock rate of a clock at the first playback device based on the first clock timing information by (i) generating at least one timing error measurement based on a difference between (a) a duration of time between a clock time of the first time source associated with a first clock timing message and a clock time of the first time source associated with a second clock timing message, and (b) a duration of time between a clock time of the first playback device when the first clock timing message was received and a clock time of the first playback device when the second clock timing message was received, (ii) estimating a clock rate error for the clock at the first playback device based on the at least one timing error measurement, and (iii) setting the clock rate to an adjusted clock rate based on the estimated clock rate error; and generate the playback timing for the audio content based on the adjusted clock rate.

3. The first playback device of claim 2, wherein the program instructions that are executable by the at least one processor such that the first playback device is configured to generate the at least one timing error measurement comprise program instructions that are executable by the at least one processor such that the first playback device is configured to generate a plurality of timing error measurements including the at least one timing error measurement.

4. The first playback device of claim 3, wherein the program instructions that are executable by the at least one processor such that the first playback device is configured to estimate the clock rate error for the clock at the first playback device comprise program instructions that are executable by the at least one processor such that the first playback device is configured to estimate the clock rate error for the clock at the first playback device based on the plurality of timing error measurements using a state estimator.

5. The first playback device of claim 1, wherein the second message transmission rate is between 10 times faster than the first message receipt rate and 10,000 times faster than the first message receipt rate.

6. The first playback device of claim 1, wherein the first time source comprises one of: (i) a remote cloud server, (ii) an alternating current (AC) power input, (iii) a global positioning system (GPS) satellite, (iv) a wireless power transmitter, or (v) a modem with an Internet connection.

7. The first playback device of claim 1, wherein the program instructions further comprise program instructions that are executable by the at least one processor such that the first playback device is configured to:
while the audio content is played back in synchrony with at least the second playback device, detect an interruption in the receipt of the first clock timing information from the first time source at the first message receipt rate; and
after detection of the interruption in the receipt of the first clock timing information, (i) discontinue controlling a clock rate of the clock at the first playback device based on the first clock timing information, (ii) continue to generate and transmit the second clock timing information to at least the second playback device at the second message transmission rate, and (iii) continue playing back the audio content in synchrony with at least the second playback device.

8. The first playback device of claim 7, wherein the at least one tangible, non-transitory computer-readable medium further comprises program instructions that are executable by the at least one processor such that the first playback device is configured to:
after detection of the interruption in the receipt of the first clock timing information and while the audio content is played back in synchrony with at least the second playback device, detect a resumption in receipt of the first clock timing information from the first time source; and
after detection of the resumption in receipt of the first clock timing information from the first time source, (i) resume control of the clock rate of the clock at the first playback device based on the first clock timing information, (ii) continue to generate and transmit the second clock timing information to at least the second playback device at the second message transmission rate, and (iii) continue playback of the audio content in synchrony with at least the second playback device.

9. The first playback device of claim 1, wherein the program instructions that are executable by the at least one processor such that the first playback device is configured to use the clock at the first playback device to generate playback timing information for the audio content comprises program instructions that are executable by the at least one processor such that the first playback device is configured to:
for an individual portion of the audio content, generate a future playback time for the individual portion of the audio content at least in part by adding a timing advance to a current clock time of the clock at the first playback device.

10. The first playback device of claim 9, wherein the at least one tangible, non-transitory computer-readable medium further comprises program instructions that are executable by the at least one processor such that the first playback device is configured to:
determine the timing advance based on an amount of time that is greater than or equal to a sum of (i) a network transit time for frames and/or packets comprising audio content transmitted from the first playback device to arrive at all other playback devices configured to use the playback timing for playing the audio content in synchrony and (ii) an amount of time for all the other playback devices configured to use that playback timing for synchronous playback to process received frames/packets from the first playback device for playback.

11. The first playback device of claim 9, wherein the program instructions that are executable by the at least one processor such that the first playback device is configured to play back the audio content in synchrony with at least the second playback device comprises program instructions that are executable by the at least one processor such that the first playback device is configured to:
use the clock time information of the clock at the first playback device and the playback timing for the portions of the audio content to playback the portions of the audio content in synchrony with at least the second playback device.

12. The first playback device of claim 11, wherein the program instructions that are executable by the at least one processor such that the first playback device is configured to use the clock time information of the clock at the first playback device and the playback timing for the portions of the audio content to playback the portions of the audio content in synchrony with at least the second playback device comprises program instructions that are executable by the at least one processor such that the first playback device is configured to:
for an individual portion of the audio content, play the individual portion of the audio content when the clock at the first playback device reaches the future playback time for the individual portion of the audio content.

13. The first playback device of claim 1, further comprising:
a clock at the first playback device, wherein the first playback device is configured to use the clock at the first playback device to generate the playback timing information for the audio content, and wherein the clock at the first playback device comprises a virtual clock that is generated based on a physical clock and at least one relationship between the physical clock and the virtual clock.

14. The first playback device of claim 13, wherein the program instructions further comprise program instructions that are executable by the at least one processor such that the first playback device is configured to:
adjust a clock rate of the clock at the first playback device by modifying the at least one relationship between the physical clock and the virtual clock.

15. A first playback device comprising:
one or more processors;
one or more communication interfaces configured to connect the first playback device to a second playback device; and
one or more tangible, non-transitory computer-readable media with program instructions stored therein, wherein the program instructions, when executed, cause the first playback device to perform functions comprising:
while communicatively coupled with a data network via the one or more communication interfaces, receive first clock timing information via a first plurality of clock timing messages from a first time source at a first message receipt rate;
receive audio content and playback timing for the audio content from the second playback device;
receive second clock timing information via a second plurality of clock timing messages from a second time source at a second message receipt rate, wherein the second message receipt rate is different from the first message receipt rate; and
play the audio content in synchrony with at least the second playback device based at least in part on the first clock timing information, the second clock timing information, and the playback timing for the audio content.

16. The first playback device of claim 15, wherein the program instructions that are executable by the one or more processors such that the first playback device is configured to play the audio content in synchrony with at least a second playback device based at least in part on the first clock timing information, the second clock timing information, and the playback timing for the audio content comprise program instructions that are executable by one or more processors such that the first playback device is configured to:
determine a timing offset based on a difference between (i) a clock time of a clock at the first playback device and (ii) a clock time of a clock at the second time source indicated in at least one of the second plurality of clock timing messages received from the second time source;
for an individual portion of audio content, determine an adjusted playback time for the individual portion of audio content based on the determined timing offset; and
play an individual portion of audio content when the clock at the first playback device reaches the adjusted playback time for the individual portion of audio content.

17. The first playback device of claim 15, wherein the program instructions that are executable by the one or more processors such that the first playback device is configured to play the audio content in synchrony with at least a second playback device based at least in part on the first clock timing information, the second clock timing information, and the playback timing for the audio content comprise program instructions that are executable by the one or more processors such that the first playback device is configured to:
estimate, using the first clock timing information, a clock rate error between a clock rate of the first time source and the clock rate of a clock in the first playback device; and
adjust a playback rate of the audio content based on the estimated clock rate error.

18. The first playback device of claim 15, wherein the first time source comprises one of (i) a remote cloud server, (ii) an alternating current (AC) power input, (iii) a global positioning system (GPS) satellite, (iv) a wireless power transmitter, or (v) a modem with an Internet connection.

19. The first playback device of claim 15, wherein the second time source comprises one of (i) a computing device configured to control the first playback device, (ii) the second playback device, or (iii) a third playback device.

20. One or more tangible, non-transitory computer-readable media comprising program instructions that are executable by at least one processor such that a first playback device is configured to:
operate in a group coordinator mode wherein the first playback device is configured to: (i) receive first clock timing information via a first plurality of clock timing messages from a first time source at a first message receipt rate, (ii) for audio content received via one or more communication interfaces of the first playback device, generate playback timing for the audio content based at least in part on the first clock timing information, (iii) transmitting portions of the audio content and playback timing for the portions of the audio content to at least a second playback device, (iv) generate and transmit second clock timing information via a second plurality of clock timing messages to at least the second playback device at a second message transmission rate, wherein the second message transmission rate is different from the first message receipt rate, and wherein the second clock timing information is based at least in part on the first clock timing information, and (vii) play back the audio content in synchrony with at least the second playback device; and
operate in a group member mode wherein the first playback device is configured to: (i) receive the first clock timing information via the first plurality of clock timing messages from the first time source at the first message receipt rate, (ii) receive the audio content and the playback timing for the audio content from the second playback device, (iii) receive the second clock timing information via second plurality of clock timing messages from second time source at a second message receipt rate, wherein the second message receipt rate is different from the first message receipt rate, and (iv) play the audio content in synchrony with at least the second playback device based at least in part on the first clock timing information, the second clock timing information, and the playback timing for the audio content.

* * * * *